(12) United States Patent
Goyal et al.

(10) Patent No.: US 8,934,488 B2
(45) Date of Patent: Jan. 13, 2015

(54) IDENTIFYING DUPLICATION IN DECISION TREES

(71) Applicant: Cavium, Inc., San Jose, CA (US)

(72) Inventors: Rajan Goyal, Saratoga, CA (US);
Kenneth A. Bullis, Los Altos, CA (US);
Satyanarayana Lakshmipathi Billa,
Sunnyvale, CA (US)

(73) Assignee: Cavium, Inc., San Jose, CA (US)

( * ) Notice: Subject to any disclaimer, the term of this patent is extended or adjusted under 35 U.S.C. 154(b) by 0 days.

(21) Appl. No.: 13/664,015

(22) Filed: Oct. 30, 2012

(65) Prior Publication Data

US 2013/0060727 A1    Mar. 7, 2013

Related U.S. Application Data

(63) Continuation of application No. 13/565,784, filed on Aug. 2, 2012.

(60) Provisional application No. 61/514,344, filed on Aug. 2, 2011, provisional application No. 61/514,382, filed (Continued)

(51) Int. Cl.
*H04L 12/28*        (2006.01)
*G06F 9/46*         (2006.01)
(Continued)

(52) U.S. Cl.
CPC .. *G06F 9/46* (2013.01); *G06N 5/02* (2013.01); *H04L 43/18* (2013.01); *H04L 63/0227* (2013.01); *H04L 45/742* (2013.01);
(Continued)

(58) Field of Classification Search
CPC ..... H04L 47/2441; H04L 69/22; H04L 47/10; H04L 45/742
USPC ............... 707/803, 694; 706/59, 14; 370/389, 370/392, 256
See application file for complete search history.

(56) References Cited

U.S. PATENT DOCUMENTS 6,467,019 B1    10/2002  Washburn
6,473,763 B1 *  10/2002  Corl et al. ............................ 1/1
(Continued)

FOREIGN PATENT DOCUMENTS

WO    WO 2009/145712 A1    12/2009
WO    WO 2013/020002 A1     2/2013
WO    WO 2013/020003 A1     2/2013

OTHER PUBLICATIONS http://en.wikipedia.org/Access_control_list, downloaded Feb. 4, 2011.

(Continued)

*Primary Examiner* — Andrew Lai
*Assistant Examiner* — Jamaal Henson
(74) *Attorney, Agent, or Firm* — Hamilton, Brook, Smith & Reynolds, P.C.

(57) ABSTRACT

A packet classification system, methods, and corresponding apparatus are provided for enabling packet classification. A processor of a security appliance coupled to a network uses a classifier table having a plurality of rules, the plurality of rules having at least one field, to build a decision tree structure including a plurality of nodes, the plurality of nodes including a subset of the plurality of rules. By identifying duplication in decision trees, the methods may produce wider, shallower trees that result in shorter search times and reduced memory requirements for storing the trees.

21 Claims, 24 Drawing Sheets

| RULE | FIELD-1 (X-RANGE) | FIELD-2 (Y-RANGE) |
|------|-------------------|-------------------|
| R1   | 0 - 31            | 0 - 255           |
| R2   | 0 - 255           | 128 - 131         |
| R3   | 64 - 71           | 128 - 255         |
| R4   | 67 - 67           | 0 - 127           |
| R5   | 64 - 71           | 0 - 15            |
| R6   | 128 - 191         | 4 - 131           |
| R7   | 192 - 192         | 0 - 255           |

Related U.S. Application Data on Aug. 2, 2011, provisional application No. 61/514,379, filed on Aug. 2, 2011, provisional application No. 61/514,400, filed on Aug. 2, 2011, provisional application No. 61/514,406, filed on Aug. 2, 2011, provisional application No. 61/514,407, filed on Aug. 2, 2011, provisional application No. 61/514,438, filed on Aug. 2, 2011, provisional application No. 61/514,447, filed on Aug. 2, 2011, provisional application No. 61/514,450, filed on Aug. 2, 2011, provisional application No. 61/514,459, filed on Aug. 2, 2011, provisional application No. 61/514,463, filed on Aug. 2, 2011.

(51) Int. Cl.

| | | |
|---|---|---|
| *G06N 5/02* | (2006.01) | |
| *H04L 12/26* | (2006.01) | |
| *H04L 29/06* | (2006.01) | |
| *H04L 12/747* | (2013.01) | |
| *H04L 12/851* | (2013.01) | |
| *H04L 12/801* | (2013.01) | |
| *H04L 12/741* | (2013.01) | |
| *G06F 9/50* | (2006.01) | |
| *H04L 29/08* | (2006.01) | |

(52) U.S. Cl.
CPC ............ *H04L47/2441* (2013.01); *H04L 47/39* (2013.01); *H04L 69/22* (2013.01); *H04L 45/745* (2013.01); *G06F 9/5027* (2013.01); *H04L 67/10* (2013.01)
USPC .......................................................... 370/392

(56) References Cited

U.S. PATENT DOCUMENTS

| | | |
|---|---|---|
| 6,476,763 B2 | 11/2002 | Allen |
| 6,735,600 B1 | 5/2004 | Andreev |
| 6,868,414 B2 | 3/2005 | Khanna et al. |
| 6,980,555 B2 | 12/2005 | Mar |
| 7,441,022 B1 | 10/2008 | Schuba et al. |
| 7,937,355 B2 | 5/2011 | Corl et al. |
| 8,156,507 B2 | 4/2012 | Brjazovski et al. |
| 2005/0013293 A1 | 1/2005 | Sahita |
| 2006/0136570 A1 | 6/2006 | Pandya |
| 2006/0155915 A1 | 7/2006 | Pereira |
| 2007/0168377 A1 | 7/2007 | Zabarsky |
| 2008/0031258 A1 | 2/2008 | Acharya et al. |
| 2010/0110936 A1* | 5/2010 | Bailey et al. .................. 370/256 |
| 2010/0175124 A1* | 7/2010 | Miranda ......................... 726/13 |
| 2011/0038375 A1 | 2/2011 | Liu et al. |
| 2013/0036102 A1 | 2/2013 | Goyal et al. |
| 2013/0039366 A1 | 2/2013 | Goyal et al. |
| 2013/0085978 A1 | 4/2013 | Goyal et al. |
| 2013/0218853 A1 | 8/2013 | Bullis et al. |
| 2013/0232104 A1 | 9/2013 | Goyal et al. |
| 2013/0282766 A1 | 10/2013 | Goyal et al. |

OTHER PUBLICATIONS

Baboescu, F., et al., "Packet Classification for Core Routers: Is there an alternative to CAMs?", *Proceedings f the 22$^{nd}$ IEEE Conference on Computer Communications (INFOCOM '03)*, vol. 1, pp. 53-63 (2003).

Baboescu, F. and Varghese, G., "Scalable Packet Classification," *Proceedings of the ACM SIGCOMM '01 Conference on Applications, Technologies, Architectures, and Protocols for Computer Communication (SIGCOMM '01)*, pp. 199-210 (2001).

Gupta, P. and McKeown, N. "Packet Classification on Multiple Fields," *Proceedings of SIGCOMM '99 Conference on Applications, Technologies, Architectures, and Protocols for Computer Communication (SIGCOMM '99)*, pp. 147-160 (1999).

Gupta, P. and McKeown, N. "Classifying Packets With Hierarchical Intelligent Cuttings," *IEEE Micro*, 20(1):34-41 (2000).

Qi, Y., et al., "Packet Classification Algorithms: From Theory to Practice," *Proceedings of the 28$^{th}$ IEEE Conference on Computer Communications (INFOCOM '09)*, pp. 648-656 (2009).

Singh, S., et al., "Packet Classification Using Multidimensional Cutting," *Proceedings of the ACM SIGCOMM '03 Conference on Applications, Technologies, Architectures, and Protocols for Computer Communication (SIGCOMM '03)*, pp. 213-224 (2003).

International Search Report in PCT/US2012/049408 dated Dec. 21, 2012, 6 pages, entitled "Packet Classification by an Optimised Decision Tree".

Fong et al., HaRP: Rapid Packet Classification via Hashing Round-Down Prefixes, *IEEE Transactions on Parallel and Distributed Systems, IEEE Service Center*, v. 22(7), pp. 1105-1119 (2011).

\* cited by examiner

IDENTIFYING DUPLICATION IN DECISION TREES

RELATED APPLICATIONS

This application is a continuation of U.S. application Ser. No. 13/565,784, filed Aug. 2, 2012, which claims the benefit of U.S. Provisional Application No. 61/514,344, filed on Aug. 2, 2011; U.S. Provisional Application No. 61/514,382, filed on Aug. 2, 2011; U.S. Provisional Application No. 61/514,379, filed on Aug. 2, 2011; U.S. Provisional Application No. 61/514,400, filed on Aug. 2, 2011; U.S. Provisional Application No. 61/514,406, filed on Aug. 2, 2011; U.S. Provisional Application No. 61/514,407, filed on Aug. 2, 2011; U.S. Provisional Application No. 61/514,438, filed on Aug. 2, 2011; U.S. Provisional Application No. 61/514,447, filed on Aug. 2, 2011; U.S. Provisional Application No. 61/514,450, filed on Aug. 2, 2011; U.S. Provisional Application No. 61/514,459, filed on Aug. 2, 2011; and U.S. Provisional Application No. 61/514,463, filed on Aug. 2, 2011.

The entire teachings of the above applications are incorporated herein by reference.

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Improving the efficiency and security of network operation in today's Internet world remains an ultimate goal for Internet users. Access control, traffic engineering, intrusion detection, and many other network services require the discrimination of packets based on multiple fields of packet headers, which is called packet classification. Internet routers classify packets to implement a number of advanced internet services such as routing, rate limiting, access control in firewalls, virtual bandwidth allocation, policy-based routing, service differentiation, load balancing, traffic shaping, and traffic billing. These services require the router to classify incoming packets into different flows and then to perform appropriate actions depending on this classification.

A classifier, using a set of filters or rules, specifies the flows, or classes. For example, each rule in a firewall might specify a set of source and destination addresses and associate a corresponding deny or permit action with it. Alternatively, the rules might be based on several fields of a packet header including layers 2, 3, 4, and 5 of the OSI model, which contain addressing and protocol information.

On some types of proprietary hardware, an Access Control List (ACL) refers to rules that are applied to port numbers or network daemon names that are available on a host or layer 3 device, each with a list of hosts and/or networks permitted to use a service. Both individual servers as well as routers can have network ACLs. ACLs can be configured to control both inbound and outbound traffic.

SUMMARY

A system, method, and corresponding apparatus relates to classifying packets.

A method may use a classifier table having a plurality of rules, the plurality of rules having at least one field, and build a decision tree structure including a plurality of nodes. Each node may represent a subset of the plurality of rules. For each node of the decision tree, the method may (a) determine a number of cuts that may be made on each at least one field creating child nodes equal to the number of cuts; (b) select a field on which to cut the node based on a comparison of an average of a difference between an average number of rules per child node created and an actual number of rules per child node created per each at least one field; (c) cut the node into a number of child nodes on the selected field, and store the decision tree structure.

The method may further determine the number of cuts that may be made on each at least field based on a maximum number of cuts for a given storage capacity.

The method may select the field on which to cut the node into a number of child nodes based on the field being a field of the at least one field with the smallest average of the difference between an average number of rules per child node and an actual number of rules per child node.

The method may cut the node only if the node has greater than a predetermined number of the subset of the plurality of rules. The predetermined number may be an adjustable number. The method may further control a depth of the decision tree structure by iteratively adjusting the predetermined number. Adjusting the predetermined number may include incrementing the predetermined number with increasing levels of the tree.

If cutting creates a plurality of child nodes and only one child node has a subset of the plurality of rules, the method may store at the node an identifier of a field of the at least one field and a number of bits of the field of the at least one field to skip upon traversing the node to obtain a rule match. The number of bits of the field of the at least one field to skip may be the same number as a number of bits used to cut the node.

While building the decision tree structure, the method may further include, for each level of the decision tree, comparing a subset of rules represented by child nodes having a same parent node. The method may identify a set of duplicate child nodes, the set of duplicate child nodes may be a duplicate subset of the plurality of rules. The method may select one child node of the set of duplicate child nodes identified as a unique child node. The method may link the other child nodes of the set of duplicate child nodes identified to a same subtree as the unique child node. The method may use the unique child node for subsequent building of the decision tree structure and refraining from using the other child nodes of the set of duplicate child nodes identified for subsequent building of the decision tree structure.

While building the decision tree, the method may further include, for each level of the decision tree, identifying partial duplicate nodes on a level of the decision tree. Partial duplicate nodes may be a partial duplicate of the subset of the plurality of the rules. The method may create a new node on the level of the decision tree based on one or more partial duplicate nodes being identified. The partial duplicate of the subset of the plurality of the rules may be included in the new node created and removed from the partial nodes identified.

A method may group the plurality of rules in the classifier table into a plurality of categories of rules. The method may build a decision tree structure including a plurality of nodes for each of the plurality of categories of rules. The plurality of categories of rules may be based on one or more field functions, or combinations of the one or more field functions, applied to the plurality of rules. One or more field functions may include applying a no Internet Protocol (IP) address wildcard, source IP but not destination IP wildcard, destination IP but no source IP wildcard, destination and source address wildcard, field range comparison, one or more masks associated with one or more of the at least one field. The method may further include walking a received packet through each decision tree built and comparing the resulting rules from each tree to select a final match. The final match selected may be the rule with a highest priority.

The method may further convert each child node having a number of rules less than or equal to a given number of rules to a leaf node. The method may create a corresponding bucket for each child node converted. The corresponding bucket may include rules of the child node converted. The method may link each leaf node to the corresponding bucket created. A set of duplicate buckets may be identified, the duplicate buckets each including a same set of rules. The method may select one bucket of the set of duplicate buckets and remove other buckets of the set of duplicated bucket. The method may change links to removed buckets to links to the one bucket selected.

The method may further identify a set of partial duplicate buckets. Partial duplicate buckets may each include a duplicate partial set of rules. The method may separate rules in each bucket in the set of partial duplicate buckets into a first and second set of rules for each bucket. The first set of rules for each bucket may include the duplicate partial set of rules and the second set of rules for each bucket may include any remaining rules for each bucket. The method may create a link in each partial duplicate bucket to the first set of rules and create a link in each partial duplicate bucket to the second set of rules. Each partial duplicate bucket may include a linked list of pointers to the first and second set of rules.

The decision tree structure may be a binary data structure.

The decision tree structure may be compiled from the classifier table.

A priority corresponding to each rule may be stored in the decision tree structure.

The method may further determine whether or not a rule is covered by one or more other rules and omit the rule from the decision tree structure if the rule is covered.

A method may use a classifier table having a plurality of rules, the plurality of rules having at least one field, for building a decision tree structure including a plurality of nodes. Each node may include a subset of the plurality of rules. The method may determine for each level of the decision tree whether to merge grandchildren of a parent node with child nodes of the parent node based on a resulting total number of child nodes of the parent node not being more than a given threshold. The method may store the decision tree structure. The method may further merge the cuts of a child node into the cuts of the parent node resulting in new child nodes of the parent node. The cuts of the child node may be on a same field as the parent node cuts or the cuts of the child node may be on a different field than the parent node cuts. The given threshold may be adjustable. The method may iteratively adjust the given threshold and merge grandchildren of a parent node with child nodes of the parent node until a resulting number of child nodes of the parent node reaches a given threshold number of child nodes.

A method may use a classifier table having a plurality of rules, the plurality of rules having at least one field, for building a decision tree structure including a plurality of nodes. Each node may include a subset of the plurality of rules. The method may group rules based on whether or not rules compete. The method may assign priority values to the plurality of rules and assign unique priority values within each group of competing rules. The method may enable non-competing rules to have a same priority value. The method may store the decision tree structure and include storing the plurality of rules and the priority value assigned.

An apparatus may include a memory and a processor coupled to the memory. The processor may be configured to use a classifier table having a plurality of rules stored in the memory, the plurality of rules having at least one field, the processor may be configured to build a decision tree structure including a plurality of nodes, the plurality of nodes including a subset of the plurality of rules. The processor may further be configured to determine, for each node of the decision tree, a number of cuts that may be made on each at least one field creating child nodes equal to the number of cuts. While determining the number of cuts that may be made on each at one least field, the processor may further be configured to select a field on which to cut the node based on a comparison of an average of a difference between an average number of rules per child node created and an actual number of rules per child node created per each at least field. The processor may further be configured to cut the node into a number of child nodes on the selected field and to store the decision tree structure in the memory.

A non-transitory computer-readable medium may have encoded thereon a sequence of instructions which, when executed by a processor, causes the processor to use a classifier table having a plurality of rules, the plurality of rules having at least one field, build a decision tree structure including a plurality of nodes, the plurality of nodes including a subset of the plurality of rules; determine, for each node of the decision tree, a number of cuts that may be made on each at least one field creating child nodes equal to the number of cuts; select, upon determining the number of cuts that may be made on each at one least field, a field on which to cut the node based on a comparison of an average of a difference between an average number of rules per child node created and an actual number of rules per child node created per each at least one field. The processor may cut the node into a number of child nodes on the selected at least field and store the decision tree structure.

The processor may select the field on which to cut the node into a number of child nodes based on the at least one field with the smallest average of the difference between an average number of rules per child node and an actual number of rules per child node.

A method may comprise using a classifier table having a plurality of rules, the plurality of rules having at least one field, building a decision tree structure including a plurality of nodes, each node representing a subset of the plurality of rules, and identify duplication in the decision tree structure. The method may include modifying the decision tree structure based on the identified duplication and storing the modified decision tree structure. The plurality of nodes may include parent nodes and child nodes. Identifying may include, for each level of the decision tree, comparing a subset of rules represented by child nodes having a same parent node and identifying a set of duplicate child nodes. The set of duplicate child nodes may have a duplicate subset of the plurality of rules. Modifying may includes selecting one child node of the set of duplicate child nodes identified as a unique child node and linking the other child nodes of the set of duplicate child nodes identified to a same subtree as the unique child node.

The method wherein the plurality of nodes includes parent nodes and child nodes may further comprise converting each child node having a number of rules less than or equal to a given number of rules to a leaf node, creating a corresponding bucket for each child node converted, the corresponding bucket including rules of the child node converted, linking each leaf node to the corresponding bucket created, identifying a set of duplicate buckets, duplicate buckets each including a same set of rules, selecting one bucket of the set of duplicate buckets and removing other buckets of the set of duplicated buckets, and changing links to removed buckets to links to the one bucket selected.

The method wherein the plurality of nodes includes parent nodes and child nodes may further comprise converting each child node having a number of rules less than or equal to a given number of rules to a leaf node, creating a corresponding bucket for each child node converted, the corresponding bucket including rules of the child node converted, linking each leaf node to the corresponding bucket created, identifying a set of partial duplicate buckets, partial duplicate buckets each including a duplicate partial set of rules, separating rules in each bucket in the set of partial duplicate buckets into a first and second set of rules for each bucket, the first set of rules for each bucket including the duplicate partial set of rules and the second set of rules for each bucket including any remaining rules for each bucket, and creating a link in each partial duplicate bucket to the first set of rules and creating a link in each partial duplicate bucket to the second set of rules. Each partial duplicate bucket includes a linked list of pointers to the first and second set of rules.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
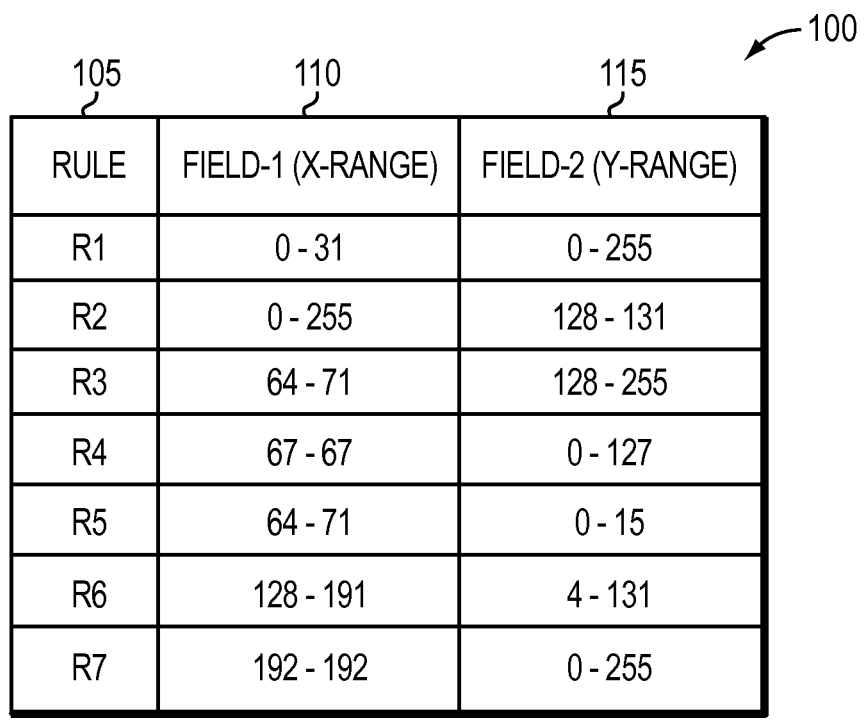
FIG. 1 illustrates a classifier table including rules for classifying a packet.

A description of example embodiments of the invention follows.

The teachings of all patents, published applications and references cited herein are incorporated by reference in their entity.

Although packet classification has been widely studied for a long time, researchers are still motivated to seek novel and efficient packet classification solutions due to: i) the continual growth of network bandwidth, ii) increasing complexity of network applications, and iii) technology innovations of network systems.

Explosion in demand for network bandwidth is generally due to the growth in data traffic. Leading service providers report bandwidths doubling on their backbone networks about every six to nine months. As a consequence, novel packet classification solutions are required to handle the exponentially increasing traffics on both edge and core devices.

Complexity of network applications are increasing due to the increasing number of network applications being implemented in network devices. Packet classification is widely-used for various kinds of applications, such as service-aware routing, intrusion prevention and traffic shaping. Therefore, novel solutions of packet classification must be more intelligent to handle diverse types of rule sets without significant loss of performance.

In addition, new technologies, such as multi-core processors provide unprecedented computing power, as well as highly integrated resources. Thus, novel packet classification solutions must be well suited to advanced hardware and software technologies.

Before describing example embodiments in detail, an example packet classification system and related methods are described immediately below to help the reader understand the inventive features described herein.

Existing packet classification methods trade memory for time. Although the tradeoffs have been constantly improving, the time taken for a reasonable amount of memory is still generally poor. Because of problems with existing methods, vendors use ternary content-addressable memory (TCAM), which uses brute-force parallel hardware to simultaneously check packets against all rules. The main advantages of TCAMs over existing methods are speed and determinism (TCAMs work for all databases).

A TCAM is a hardware device that functions as a fully associative memory. A TCAM cell stores three values: 0, 1, or 'X,' which represents a don't-care bit and operates as a per-cell mask enabling the TCAM to match rules containing wildcards (e.g., don't care bits). In operation, a whole packet header can be presented to a TCAM to determine which entry (rule) it matches. However, the complexity of TCAMs has permitted only small, inflexible, and relatively slow implementations that consume a lot of power. Therefore, a need continues for efficient methods operating on specialized data structures.

Current methods remain in the stages of mathematical analysis and/or software simulation (observation based solutions). Proposed mathematic solutions have been reported to have excellent time/spatial complexity. However, methods of this kind have not been found to have any implementation in real-life network devices because mathematical solutions often add special conditions to simplify a problem and/or omit large constant factors which might conceal an explicit worst-case bound.

Proposed observation based solutions employ statistical characteristics observed in rules to achieve efficient solution for real-life applications. However, these observation based methods generally only work well with specific types of rule sets. Because packet classification rules for difference applications have diverse features, few observation based methods are able to fully exploit redundancy in different types of rule sets to obtain stable performance under various conditions.

Packet classification is performed using a packet classifier, also called a policy database, flow classifier, or simply a classifier. A classifier is a collection of rules or policies. Packets received are matched with rules, which determine actions to take with a matched packet. Generic packet classification requires a router to classify a packet on the basis of multiple fields in a header of the packet. Each rule of the classifier specifies a class that a packet may belong to, according to criteria on 'F' fields of the packet header, and associates an identifier (e.g., class ID) with each class. For example, each rule in a flow classifier is a flow specification, in which each flow is in a separate class. The identifier uniquely specifies an action associated with each rule. Each rule has 'F' fields. An ith field of a rule R, referred to as R[i], is a regular expression on the ith field of the packet header. A packet P matches a particular rule R if for every i, the ith field of the header of P satisfies the regular expression R[i].

Classes specified by the rules may overlap. For instance, one packet may match several rules. In this case, when several rules overlap, an order in which the rules appear in the classifier may determine the rule's relative priority. In other words, a packet that matched multiple rules belongs to the class identified by the identifier (class ID) of the rule among them that appears first in the classifier. Alternatively, a unique priority associated with a rule may determine its priority, for example, the rule with the highest priority.

Packet classifiers may analyze and categorize rules in a classifier table and create a decision tree that is used to match received packets with rules from the classifier table. A decision tree is a decision support tool that uses a tree-like graph or model of decisions and their possible consequences, including chance event outcomes, resource costs, and utility. Decision trees are commonly used in operations research, specifically in decision analysis, to help identify a strategy most likely to reach a goal. Another use of decision trees is as a descriptive means for calculating conditional probabilities. Embodiments described herein utilize decision trees to selectively match a received packet with a rule in a classifier table to determine how to process the received packet.

A decision tree of rules, or tree, represents a set of rules. The decision tree may also be called a Rule Compiled Data Structure (RCDS) or a performance tree. The tree is a binary data structure having nodes and leaves. Each leaf of the tree points to a subset of the rules, called a bucket of rules, or bucket. Each of the buckets represents a subset of the rules. Each bucket is a data structure (e.g., an array) containing pointers to rules, which are stored in a rule table. Rules (or pointers to rules) within a bucket are ordered by priority (e.g., in increasing or decreasing priority). A rule table is a data structure (e.g., an array) containing the rules. Rules within the rule table may be ordered or unordered.

FIG. 1 illustrates a classifier table 100 including rules for classifying a packet. As illustrated, the classifier table contains seven rules (R1-R7), each containing two fields, Field-1 110, and Field-2 115. Although the table illustrates rules being 2-tuple (e.g., containing only two fields), it should be noted that rules may contain an n number of fields and be n-tuple. Each rule specifies a range of values (e.g., Internet Protocol (IP) addresses or Layer 4 ports or protocols) in each dimension (field). For example, Field-1 may be represented in the x-dimension of an x/y graph, while Field-2 may be represented in the y-dimension of an x/y graph.

Figure 2:
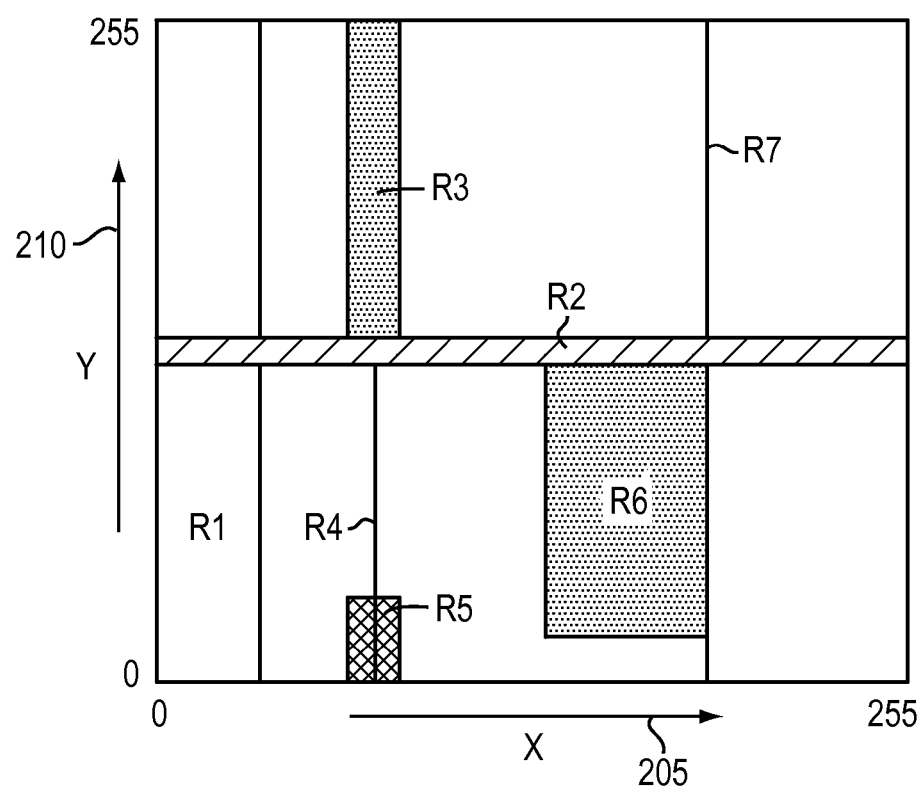
FIG. 2 illustrates a geometric representation of the rules of the classifier table illustrated in FIG. 1.

FIG. 2 illustrates a geometric representation of the rules of the classifier table 100. The rules range from values 0-255 in both the x-dimension 205 and y-dimension 210. As illustrated, each dimension of the graph is subdivided based on the ranges of each field of each rule from classifier table 100.

Figure 3A:
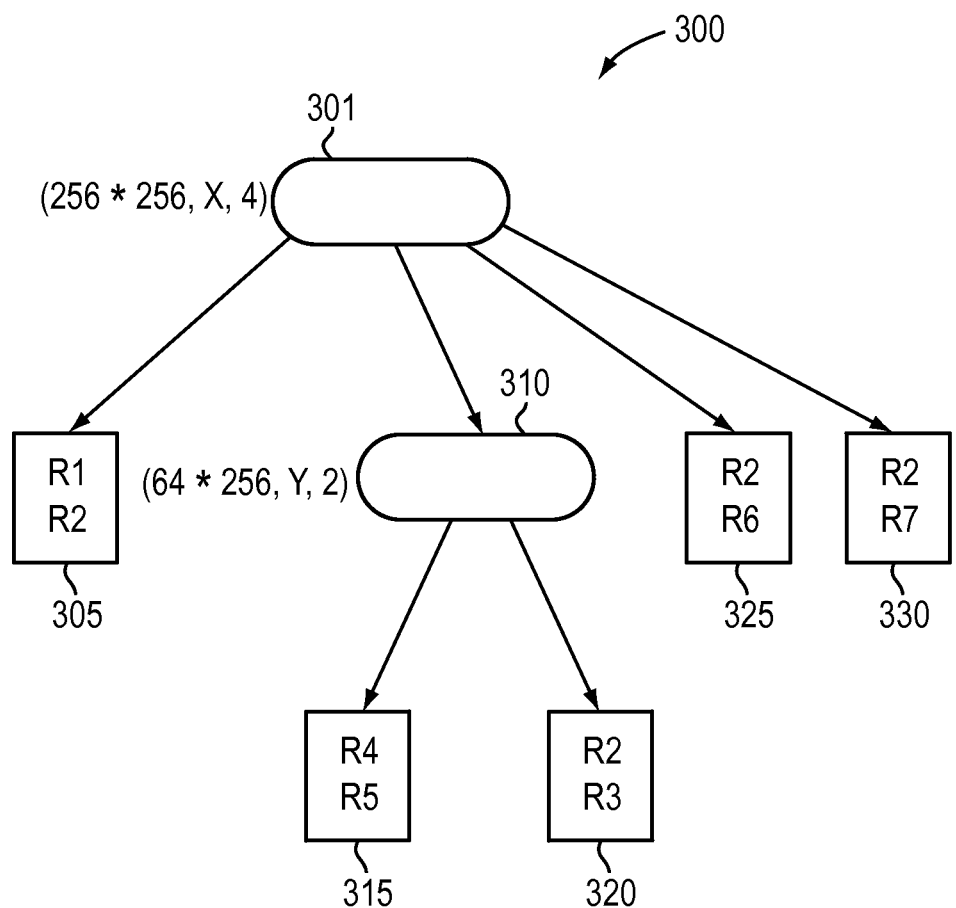
FIG. 3A illustrates a decision tree data structure compiled from the classifier table illustrated in FIG. 1.

FIG. 3A illustrates a decision tree data structure 300 compiled from the classifier table 100. The decision tree 300 contains a set of elements called nodes (301, 305, 310, 315, 320, 325, 330) that are empty or satisfy one of the following conditions: i) there is a distinguished node r, called the root node, and ii) the remaining nodes are divided into disjoint subsets, each of which is a sub-tree. As illustrated, node 301 is the root node of the decision tree and a parent node of nodes 305, 310, 325, and 330, which are considered child nodes of root node 301. The degree of a node is the number of non-empty sub-trees the node contains. A node with degree zero is considered a leaf node. Thus, nodes 305, 315, 320, 325, and 330 are considered leafnodes. Nodes with a positive degree are internal nodes (e.g., node 310).

Each node of the decision tree 300 contains a subset of rules of a classifier table. As stated above, each rule has 'F' fields and an ith field of a rule R, referred to as R[i], is a regular expression on the ith field of a received packet header. A packet P matches a particular rule R if for every i, the ith field of the header of P satisfies the regular expression R[i]. Thus, when a packet is received, a decision tree is walked (e.g., by a runtime walker) to determine a matching rule, which is used to determine an action to take with the received packet.

For example, if a packet is received that contains headers matching rule R7 (see FIG. 1), decision tree 300 is walked (e.g., traversed) to find matching rule R7. Thus, the packet is first passed through root node 301, which contains all rules of the packet classification table, which has been cut into four children. Cutting a node refers to subdividing the node into n number of child nodes. The n number of child nodes created corresponds to the number of cuts (subdivisions) of the node that are made. In this example, the rules in root node 301 have been subdivided into four distinct ranges (corresponding to each child node 305, 310, 325, and 330). Thus, it is determined that the packet should be passed to child node 330 that contains a subset of rules having fields within a range of each header of the received packet. After the packet is passed to node 330, the packet is matched with rule R7.

Example embodiments described herein build a decision tree data structure by carefully preprocessing a classifier. Each time a packet arrives, the runtime walker traverses the decision tree to find a leaf node that stores a small number of rules. Once the leaf node is reached, a linear search of the rules within the leaf node occurs to find a matching rule.

During building of the decision tree, embodiments described herein determine the shape and depth of the decision tree.

Figure 3B:
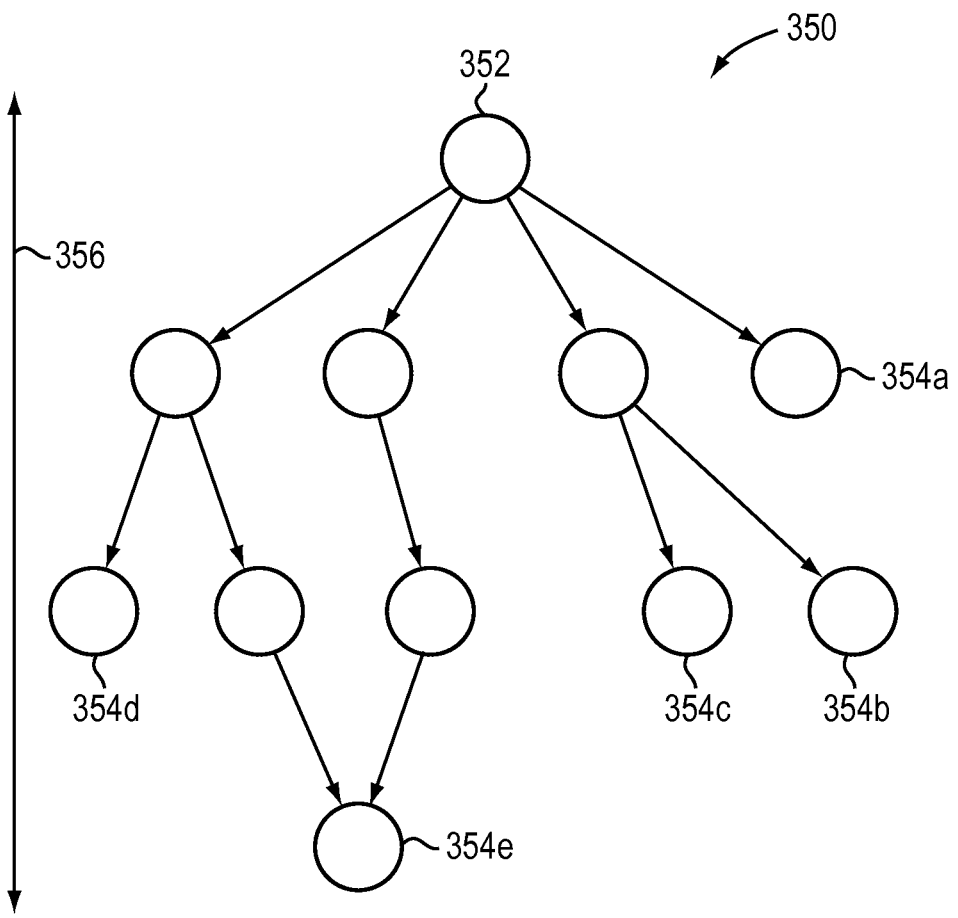
FIG. 3B illustrates depth of a decision tree data structure.

FIG. 3B illustrates a decision tree data structure 350 that includes a root node 352, and leaf nodes 354a-e, and has a depth 356.

Figure 3C:
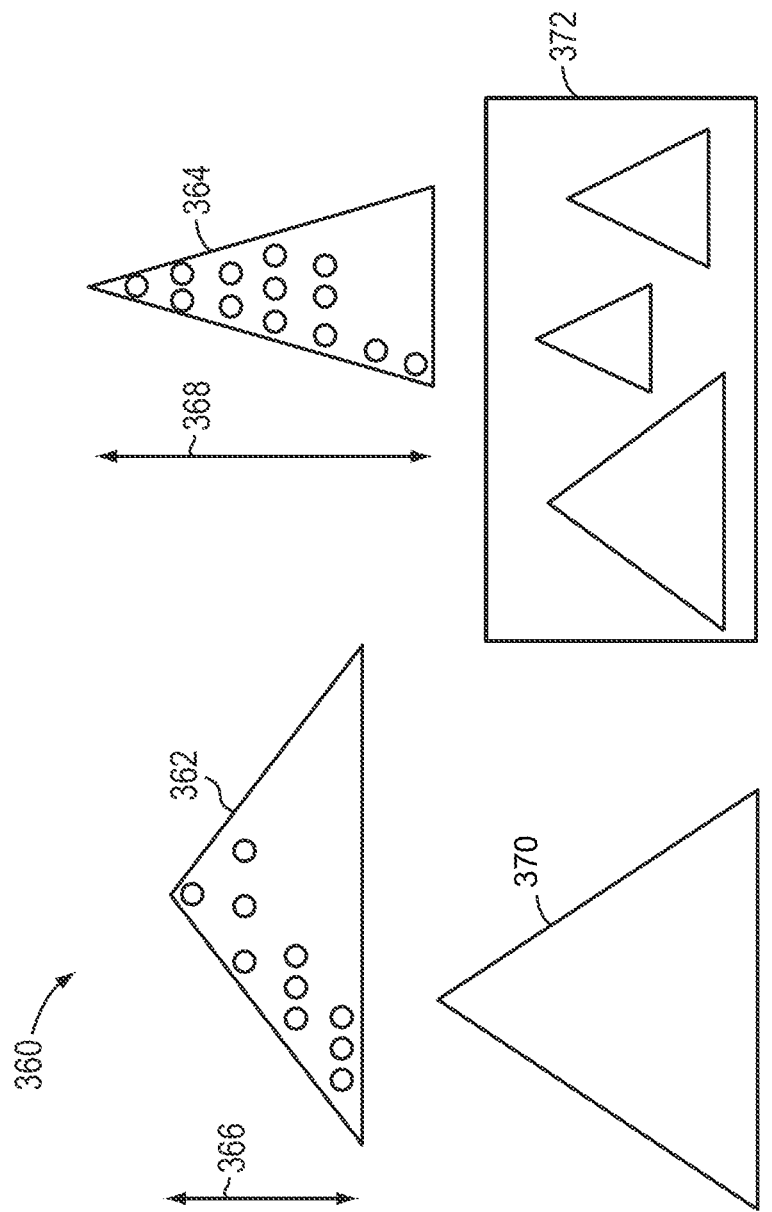
FIG. 3C illustrates depth and shape of decision tree data structures.

FIG. 3C illustrates depth and shape of decision tree data structures (360). For example tree data structure 362 has a depth 366 that is shallow in comparison to the depth 368 of decision tree data structure 364. The number of subtrees in the decision tree data structure may alter the shape of the decision tree data structure, for example a single subtree 370 versus a group of subtrees 372.

In addition, embodiments described herein determine which field to cut at a node of the decision tree and the number of cuts to make on the field to create child nodes based on the field cut and the number of cuts made on the field.

Figure 4:
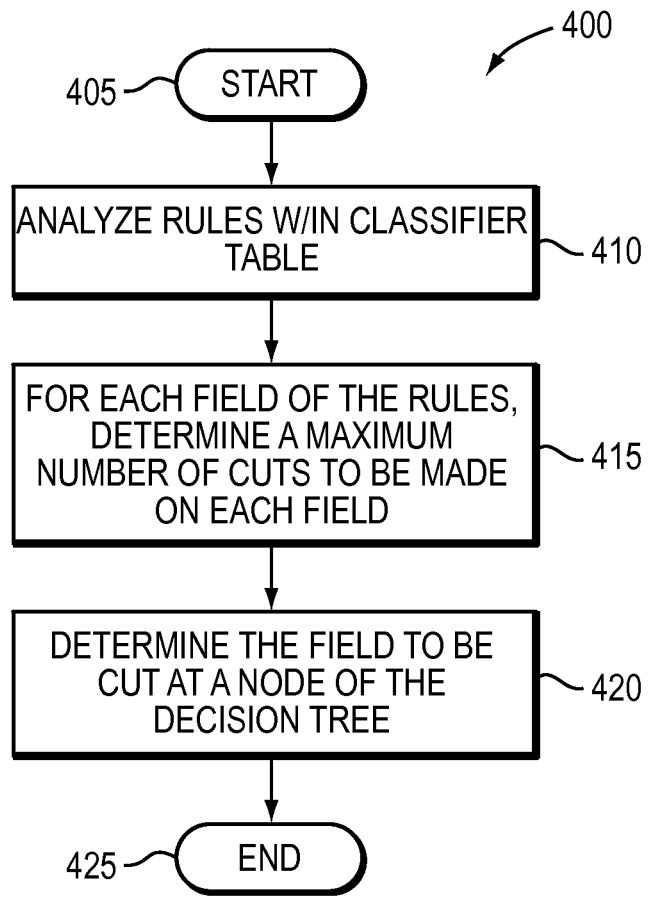
FIG. 4 is a flow diagram of a method for building a decision tree.

FIG. 4 is a flow diagram of a method 400 for building a decision tree. The method begins (405). The method analyzes a classifier table including rules for classifying a packet (410). As stated above, each rule in the classifier table has 'F' fields. The method analyzes the classifier table to determine a number of rules and a number of fields associated with each rule. Based on the analysis, at 415, the method determines a maximum number of cuts that can be made on each field 'F' of the rules. For example, a maximum number of cuts may be based on a given storage capacity. The method, for each node of the decision tree, may determine the field 'F' on which to cut the node to create child nodes (420), then the method ends (425). Determining the number of cuts that can be made on each field 'F' may balance efficiency and memory requirements. A large number of cuts on a field may decrease a decision tree's depth, accelerating query time; however, too large a number of cuts increases storage demand.

Figure 5:
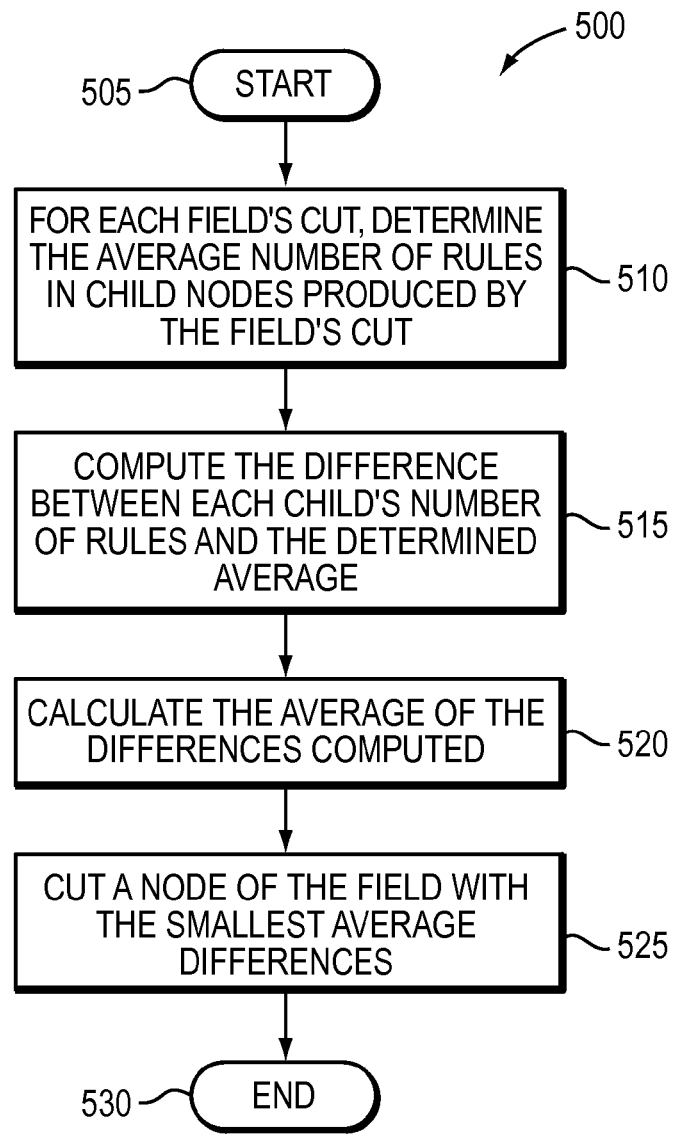
FIG. 5 is a flow diagram of a method for determining a field on which to cut a node.

FIG. 5 illustrates a flow diagram of a method 500 for determining a field on which to cut a node. By computing, for each field's cut, an average number of rules in the children produced by that cut, the difference between each child's actual number of rules and the average may be computed, and those differences may then be averaged, such that the field with the smallest such difference average may be selected. A tree that is shallower on average may be built, resulting in a shorter search time.

The method begins (505) and, based on the determined number of cuts to be made on each field (415 of method 400), determines an average number of rules in child nodes produced by cutting each field (510). The method computes a difference between an actual number of rules in each child node number of rules and the determined average number of rules in each child node (515). The method computes the average of the differences computed (520). The method cuts a node of the decision tree on the field with the smallest average difference (525).

Methods 400 and 500 are iterated on each node of the decision tree, until leaf nodes are created having no more than a given number of rules. The given number is adjustable. Methods 400 and 500 begin building a decision tree by starting with a root node that represents a complete rule list. Using method 400, a determination is made as to the number of cuts to be made on each dimension (field).

Once a determination is made as to the number of cuts to be made on each dimension, method 500 is used to determine which dimension to cut the root node of the decision tree. The cut on the root node causes child nodes to be created. Methods 400 and 500 are repeated on each child node until the only nodes remaining are leaf nodes (e.g., a node where no additional cuts can be made based on the number of rules in the child node and a given adjustable threshold number of rules for the child node). In other words, local decisions are taken at each node which results in the overall decision tree.

Figure 6:
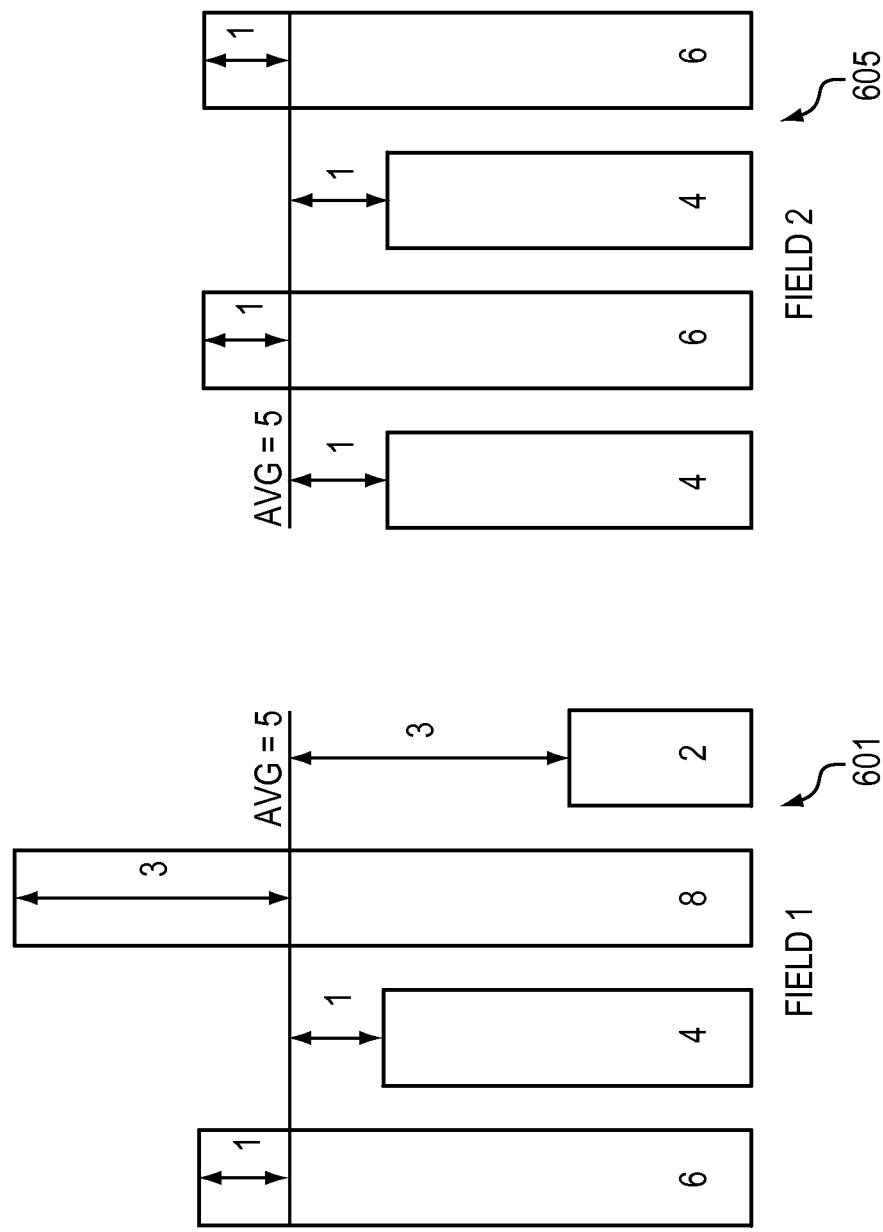
FIG. 6 is a diagram illustrating cuts made to fields of rules in a classification table.

FIG. 6 is a diagram illustrating cuts made to fields of rules in a classification table. Field-1 601 of a classifier table has been cut into 4 children, with each child containing 6, 4, 8, and 2 rules respectively. Field-2 605 of a classifier table has also been cut into 4 children containing 4, 6, 4, and 6 rules respectively. Referring to 510 of method 500, an average number of rules in child nodes by cutting each field are determined. As illustrated in FIG. 6, the average number of rules in both Field-1 and Field-2 per child node is 5 rules. Further, FIG. 6 illustrates the computed difference between the actual number of rules in each child node and the average difference, corresponding to 515 of method 500. The average of the calculated differences is then computed. For Field-1 601 the average difference is 2, while the average difference for Field-2 605 is 1. Thus, referring to 525 of method 500, a node is cut on Field-2 605 because the average difference is less than the average difference calculated for Field-1.

Once a cut for a node has been chosen, embodiments described herein determine whether to merge cuts made by a node's children. Merging entails grouping a parent node and the parent node's children into a single node. For example, if child nodes are cut on fields different than the parent node, the result would be a parent node that cuts on multiple fields.

In addition, child nodes that cut on the same field as the parent node may also be merged with the parent node by relaxing a space limit. The node resulting from the merge may have up to the absolute maximum number of children; for example, it is not constrained by a heuristic such as a maximum-space formula.

For example, a rule set (e.g., classifier table) may contains rules with 3 tuples or fields, F1, F2 and F3. In this example, a root node (N0) may cut on F1 and a number of cuts may be four. For example, 2 bits of F1 may be taken to decide a cut identifier. The result may be that the root node has 4 children, for example, N1, N2, N3 and N4. If N1 is cut on F1 and has 4 cuts, for example, 2 bits of F1 are taken to decide the cut identifier, N1 would have 4 children, for example, N11, N12, N13, N14. If N2 is cut on F2 and has 4 cuts, for example, 2 bits of F2 are taken to decide a cut identifier, N2 will have 4 children, for example, N21, N22, N23, N24. If N3 is cut on F1 and has 4 cuts, for example 2 bits of F1 are taken to decide the cut identifier, N3 will have 4 children, for example N31, N32, N33, N34. If N4 is cut on F3 and has 4 cuts, for example 2 bits of F3 are taken to decide the cut identifier; N4 would have 4 children, for example, N41, N42, N43, N44. The example describes that N0 may be cut on 3 fields, for example F1, F2 and F3 and the total cuts would be 256. The 4 bits of F1, 2 bits of F2 and 2 bits of F3 may be combined as 8 bits to cut N0, resulting in 256 children. A lesser number of levels is provided as there are only 2 levels as compared to the earlier 3 levels. The layer of N1, N2, N3, N4 has been removed, and the root node N0 and has its 256 children. A result in this example is that a total number of nodes in the tree is 257, as compared to 21 in original tree before merging. A balance is made between storage and performance tradeoff. For example, levels of the tree may be reduced at the expense of more nodes in tree.

Figure 7:
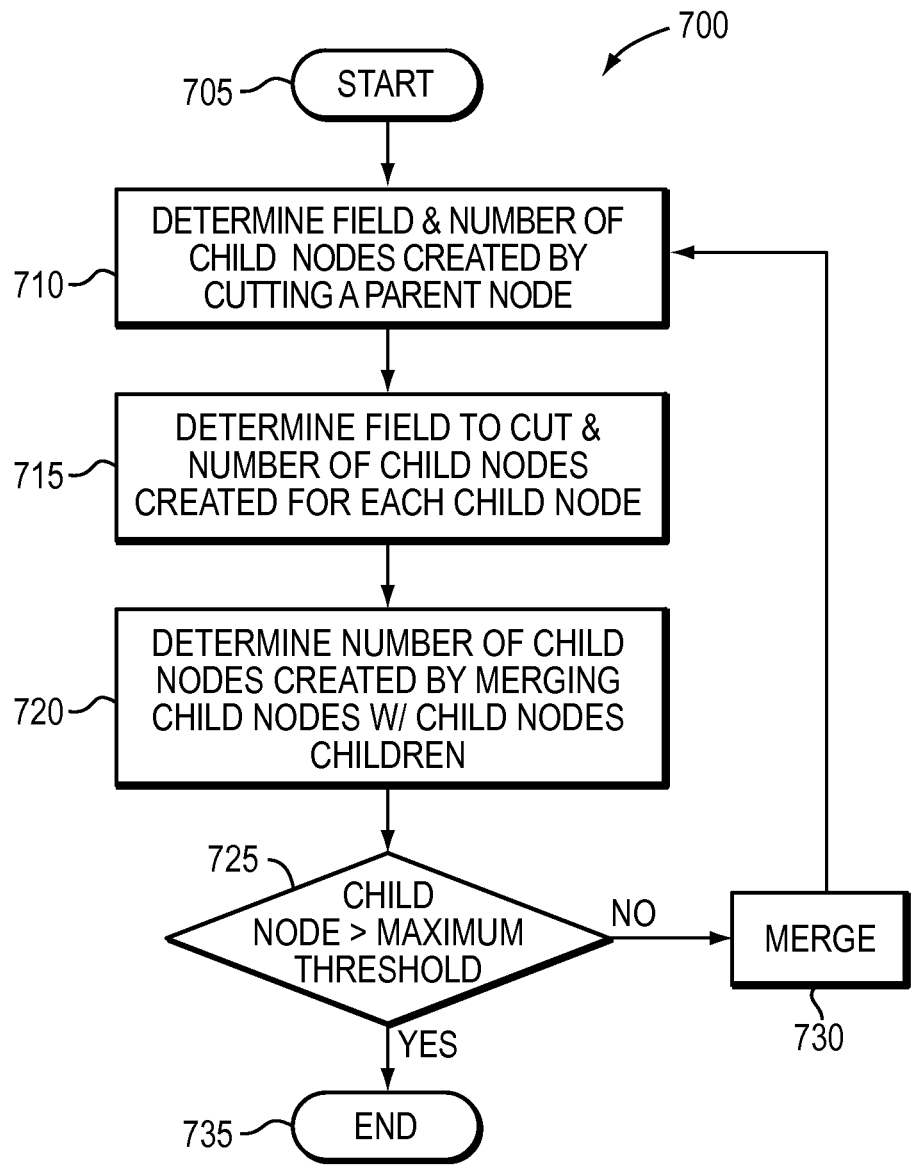
FIG. 7 is a flow diagram of a method for merging nodes of a decision tree.

FIG. 7 is a flow diagram of a method 700 for merging nodes of a decision tree. The method begins (705) and determines the field and number of child nodes to be created for the original node (e.g., a parent node) (710). The method makes a similar determination for each of the child nodes (715). The method determines the number of child nodes that results from a merge (720). The method determines if the resulting number of child nodes is within a predetermined maximum number of child nodes (725). If not, the method ends (735). If so, the method merges the nodes (730). Method 700 iterates for new sets of child nodes until merging is no longer possible. The predetermined maximum may be adjusted at each iteration. As a result, trees may be built that are wider and shallower, resulting in shorter search times.

Figure 8A:
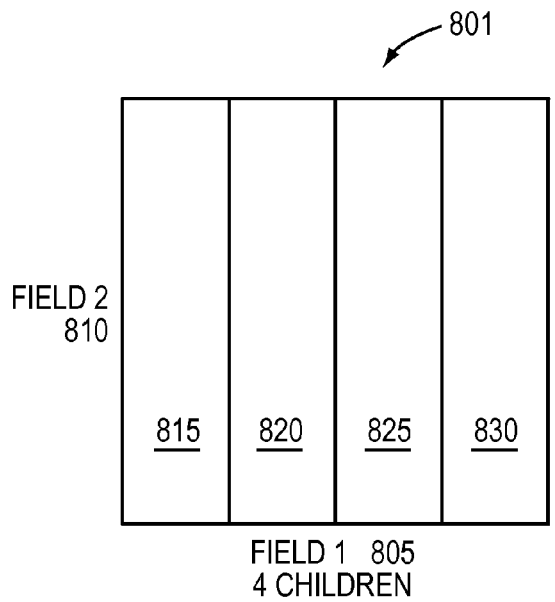
FIGS. 8A-C show a graphical example of merging nodes.
Figure 8B:
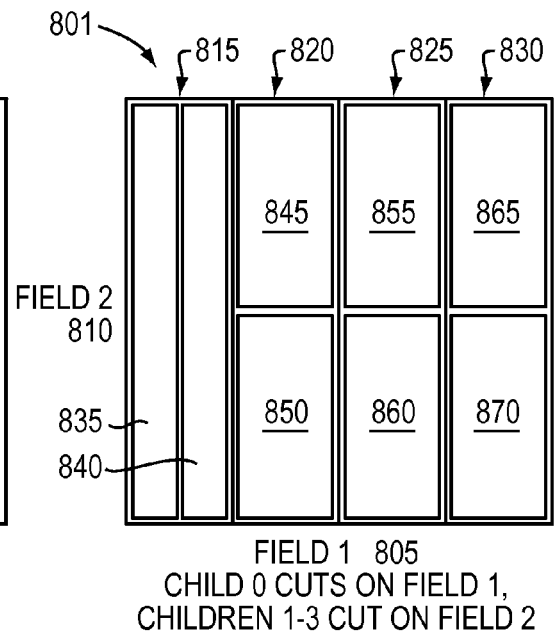
Figure 8C:
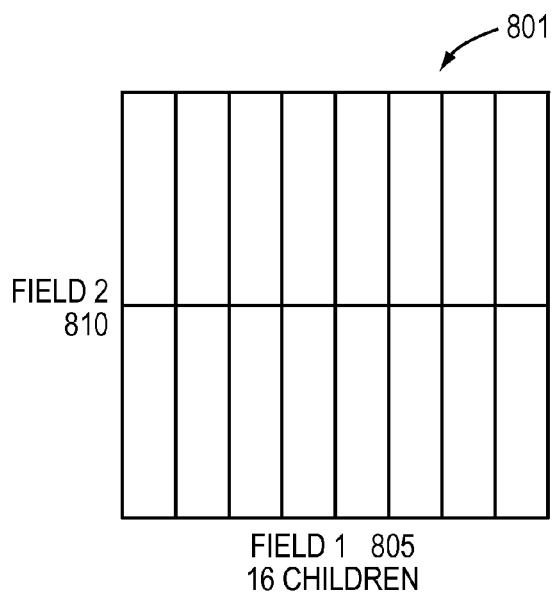

FIG. 8A-C shows a graphical example of merging nodes. FIG. 8A is a graphical example of cuts made on fields of rules in a classifier table on a single node 801. For example, FIG. 8A illustrates a single node 801 that has rules having only two fields Field-1 805 and Field-2 810. Node 801 has been subdivided (e.g., cut) into four child nodes 815, 820, 825, and 830, as represented by the subdivisions of Field-1 805.

FIG. 8B illustrates the cuts made on the child nodes 815, 820, 825, 830 of node 801. For example, child node 815 has been cut on Field-1 805 creating child nodes 835 and 840. Child nodes 820, 825, and 830 have been cut on Field-2 810 creating child nodes 845-870.

FIG. 8C illustrates the merging of child nodes 815-830 and 835-870. As illustrated, root node 801 is now cut on both Field-1 805 and Field-2 810 creating 16 child nodes.

Sometimes, even when a node is cut into the maximum number of children, only one child has any rules, because all the node's rules are clustered into one small area of a search space.

Figure 9A:
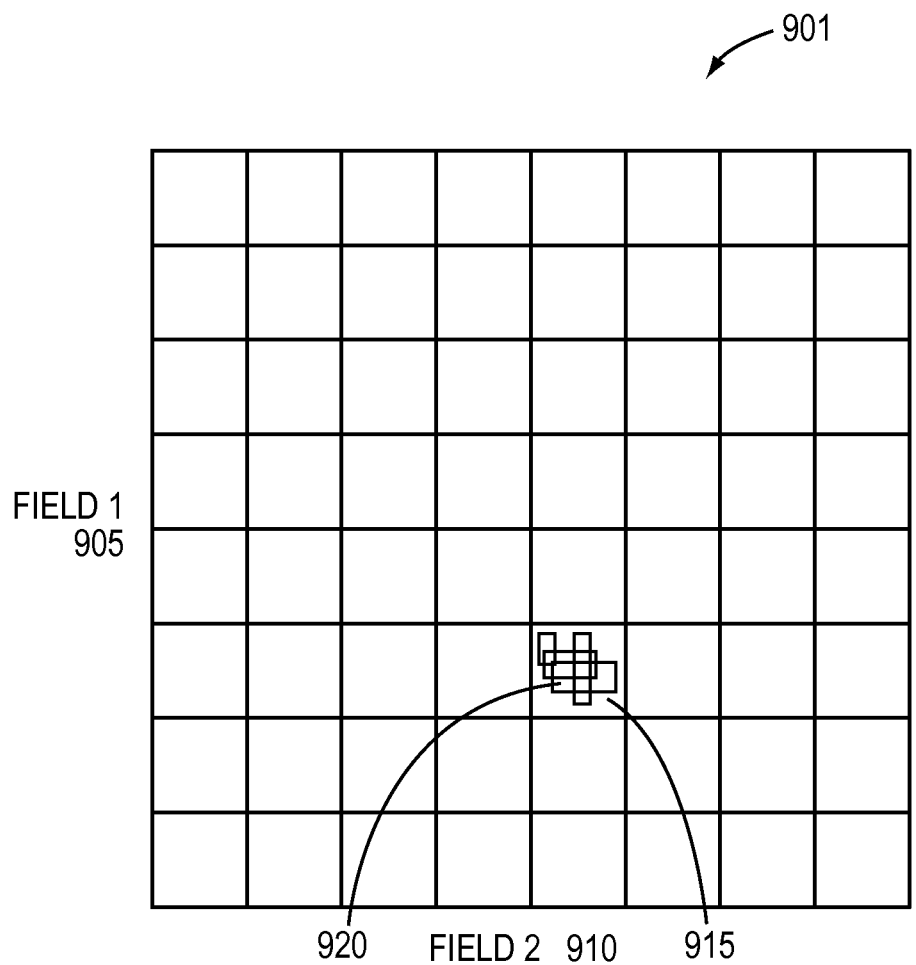
FIG. 9A shows a graphical example of a node cut resulting in a child node having all the rules of a classifier table.

FIG. 9A shows a graphical example of a node 901 that has been cut resulting in a child node 915 having all the rules 920 of a classifier table. Even after cutting both Field-1 905 and Field-2 910 by a factor of 8, into a total of 64 children, all of the node's original rules are inherited by a single child node 915. A runtime walker may be used to traverse a received packet through the decision tree data structure to obtain a matching rule. In this case, the runtime walker may have to spend time traversing this node, but does not achieve any subdivision of the search space. A key, such as data extracted from header tuples of the packet, may be used by the runtime walker for matching against rules. In this case, the only thing the runtime walker achieves is consuming the next few bits of the key in order to get down to the bits that can be used to choose among the rules. Embodiments herein may store, at each node, a number of bits a runtime walker should skip over as well as the number (identifier) of the field whose bits are to be skipped, when the walker traverses the node. As a result, the number of tree nodes that a runtime walker must traverse may be reduced, resulting in shorter search times.

Embodiments described herein include at least three data structures that include: i) a tree, ii) buckets, and iii) a rule table. A tree includes nodes and leaf nodes. Leaf nodes may be linked to buckets. The leaf nodes may point to buckets, buckets may contain a set of rules. Embodiments described herein may store rules in common tables and the buckets pointed to by leaf nodes may contain rule numbers corresponding to the rules in the rules table. Buckets may include rules in any suitable manner as may be known to one skilled in the art. Each bucket may be a data structure that may include one or more bucket entries. A bucket entry may be a rule, an index to a rule, a pointer to a rule, a pointer to a set of rules, or a pointer to another bucket. A bucket may include a linked list to the rules. A bucket may include entries including any combination thereof. For example, a bucket may have one entry that is a pointer to a rule and one entry that is a pointer to a set of rules, etc. Rule priority may be stored with a rule or linked to a rule in any suitable manner.

Figure 9B:
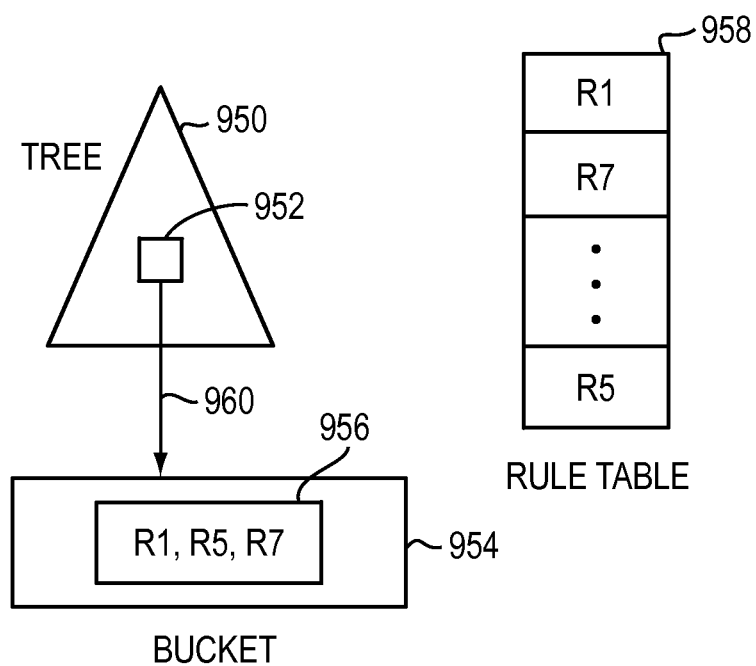
FIG. 9B is an illustration of a tree, a leaf node pointing to a bucket containing a set of rules of a classifier rule table.

FIG. 9B is an illustration of an example embodiment of a tree 950, a leaf node 952 pointing to (960) a bucket 954 containing a set of rules 956 of a classifier rule table 958.

Figure 9D:
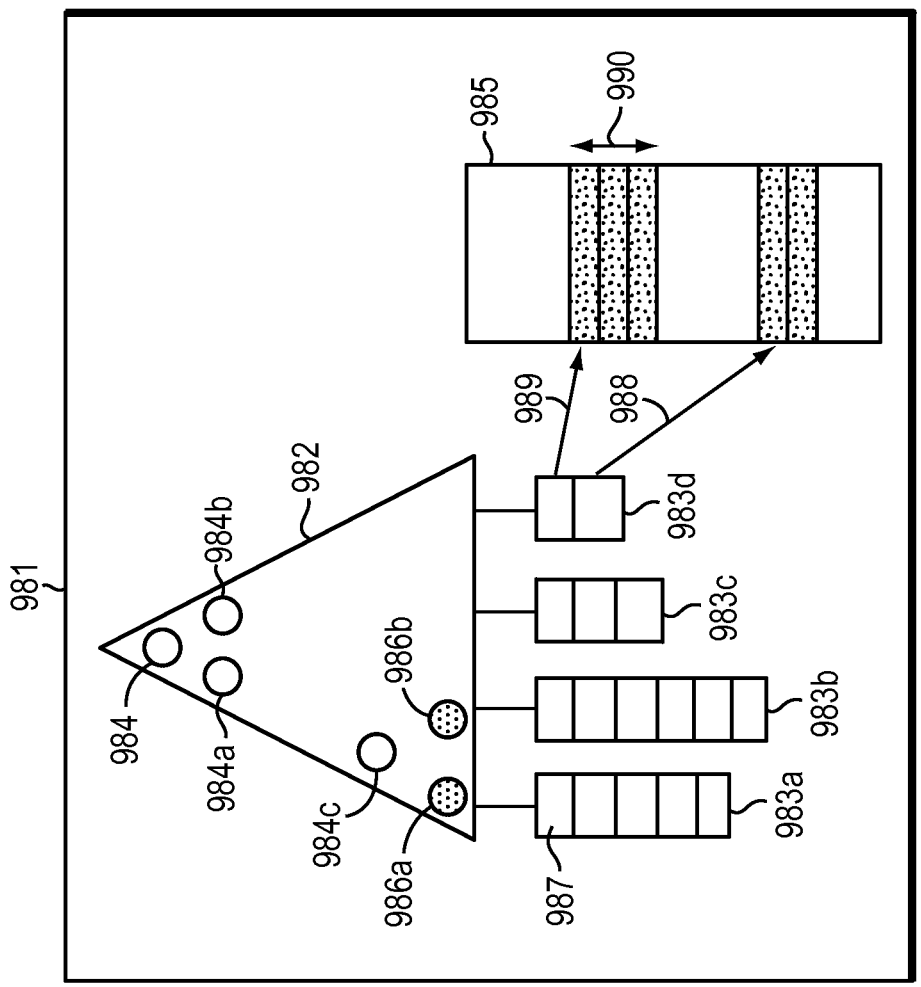
FIG. 9D illustrates a decision tree data structure including a tree, buckets, and rules.
Figure 9C:
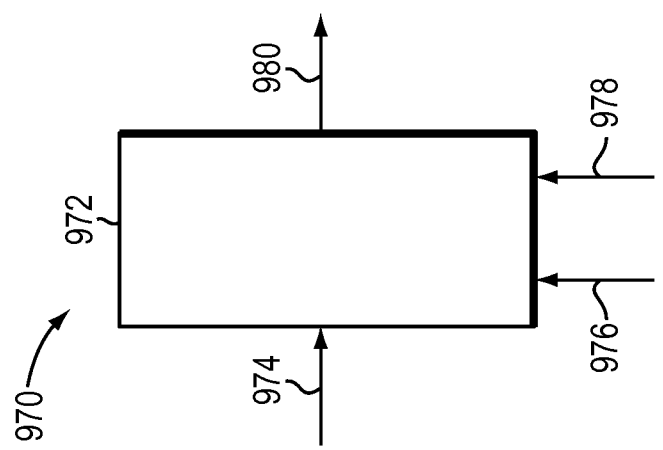
FIG. 9C is a block diagram illustrating an example embodiment of compiling a set of rules into a decision tree data structure.

FIG. 9C is a block diagram 970 illustrating an example embodiment of compiling a set of rules into a decision tree data structure. A software compiler 972 may receive a rule set 974, a maximum tree depth 976 and a number of subtrees 978. The software compiler 972 may generate a set of compiled rules 980.

FIG. 9D illustrates a decision tree data structure 981 including a tree, buckets, and rules. The set of compiled rules 980 may generate a decision tree data structure 981 including a tree 982, buckets 983a-d, and rules 985. The tree 982 may include a root node 984, nodes 984a-c, and leaf nodes 986a-b. Each leaf node 986 of the tree 982 points to a bucket 983. Each bucket may include one or more bucket entries 987. A leaf node may include bucket information that may be used to locate the bucket entries or a bucket list of entries. A bucket entry may be a pointer to rule (988), or a pointer (989) to a set of rules (990). The set of rules 990 may be a sequential group of rules, or a group of rules scattered throughout the memory, either organized by a plurality of pointers or by a method used to recollect the set of rules. The set of rules 990 may also be called a chunk, or a chunk of rules. A bucket entry that points to the set of rules 990 may be called a chunk pointer.

Embodiments described herein identify i) bucket duplication, ii) rule duplication, iii) node duplication, and iv) priority duplication. Once a decision tree is built, it may be determined that some leaf nodes point to buckets containing the same rules (e.g., duplicate rules) or some may point to buckets containing a partial duplicate. Embodiments described herein identify duplication of data and determine how to reuse or share the duplicated data so that there is only a single instance of the duplicated data.

Embodiments described herein may remove duplicate buckets keeping only a single copy. For example, in some scenarios different leaf nodes may have buckets that contain the same rules. In such a situation, a single bucket is stored and all the leaf nodes point to the same bucket. Thus, the memory required to hold a given tree may be reduced.

In some scenarios, when a parent node is cut to generate child nodes, some of the child nodes inherit the same rule sets. This is called node duplication. For example, if a parent node has 100 rules starting from rule R1 to rule R100 and the parent node is cut into 64 children, several of the 64 child nodes may inherit the same rules. Embodiments described herein may identify the child nodes that contain the same rule set, and only process one of the nodes having the same rules.

Figure 10A:
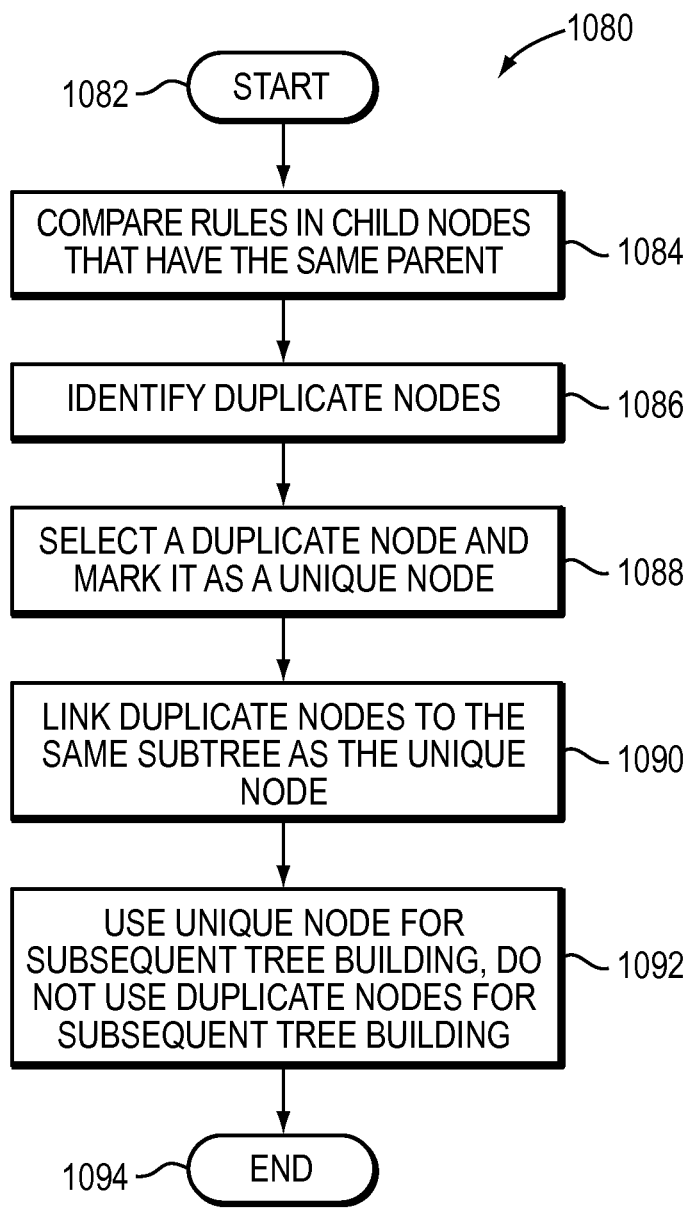
FIG. 10A is a flow diagram that illustrates a method identifying the child nodes that contain the same rule set.

FIG. 10A is a flow diagram that illustrates a method (1080) identifying the child nodes that contain the same rule set. The method begins (1082) and compares a subset of rules represented by child nodes having a same parent node (1084). Child nodes having the same parent node may be called siblings. Child nodes of the same parent that contain the same rule set are identified as of duplicate child nodes (1086). One child node of the set of duplicate child nodes may be selected (marked) as a unique child node (1088). The other duplicate child nodes of the set of duplicate child nodes may be linked to the same subtree as the unique child node (1090). The unique child node may be used for subsequent building of the decision tree structure, and the other child nodes of the set of duplicate child nodes may not be used for subsequent building of the decision tree structure (1092) and the method ends (1094).

As stated above, packet classification may result in the matching of more than one rule from the rule classification table. A rule having a highest priority is chosen for classifying a received packet. Embodiments described herein may determine priority of rules for overlapping rules. Rather than storing a unique priority for each rule in a rule classification table, which is resource intensive and requires a great amount of storage space, embodiments described herein may categorize rules based on overlapping criteria. Rules may be categorized into priority groups and rules within each priority group may be assigned a unique priority. Rules within priority groups compete for a match. By assigning unique priority within a priority group, competing rules are prioritized. However, the priorities are only unique within the priority group, thus the same priority values may be shared with rules that do not compete, the reducing the total number of priority values needed. Priority duplication saves storage space by providing a priority value on a per overlapping criteria basis instead of requiring a unique priority value to be stored for each rule.

Figure 10B:
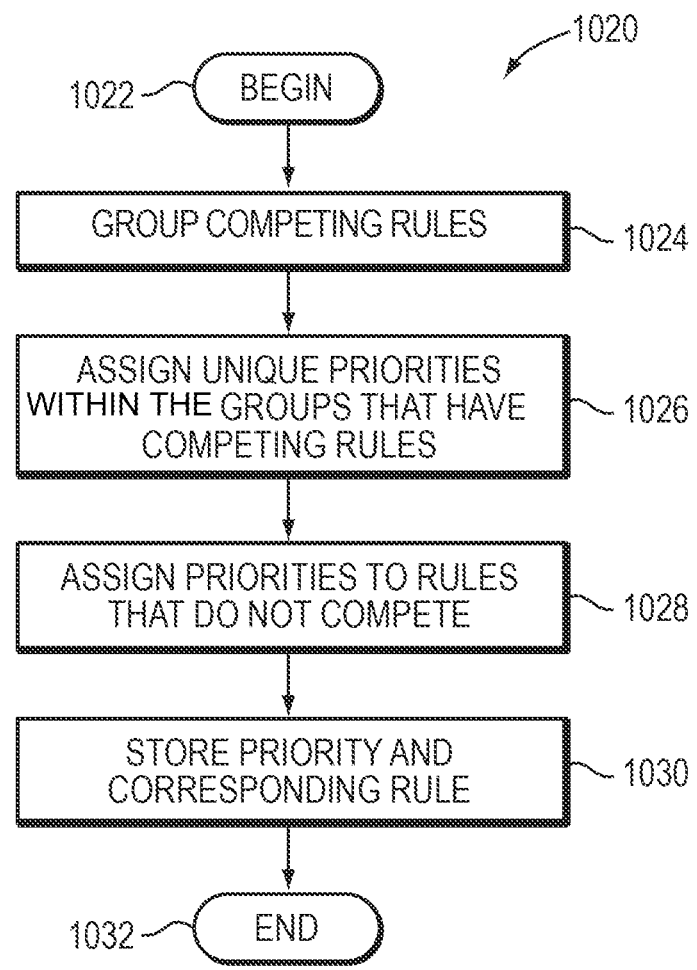
FIG. 10B is a flow diagram of a method for priority duplication.

FIG. 10B is a flow diagram of a method for priority duplication (1020). The method begins (1022) and groups rules based on whether or not the rules compete (1024). Priority values may be assigned to the plurality of rules. Unique priority values may be assigned within each group of competing rules (1026). Non-competing rules may be assigned a priority, the priority assigned to non-competing rules may overlap with the unique priorities assigned within the groups of competing rules (1028). The storing decision tree structure may store the plurality of rules and the priority value assigned (1030) and the method ends (1032).

Figure 10C:
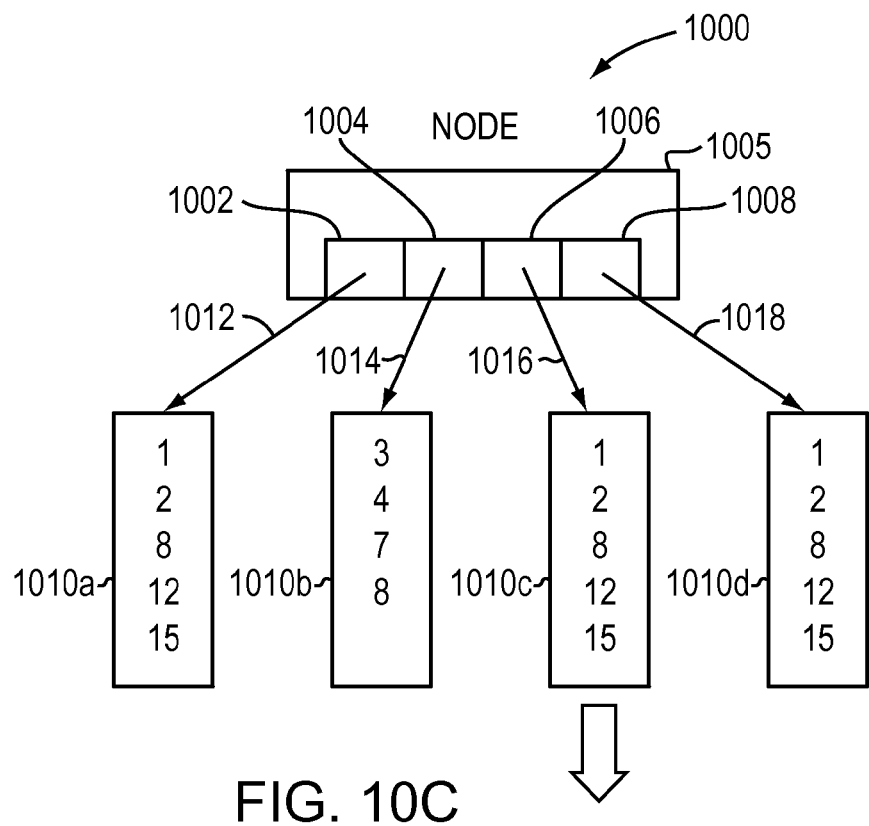
FIGS. 10C-D illustrate a graphical example of removing duplicate buckets of rules in a node of a decision tree.

FIG. 10C illustrates a graphical example of removing duplicate buckets of rules in a node of a decision tree (1000). As illustrated, a node 1005 has 4 leaf nodes 1002, 1004, 1006, and 1008. The node 1005 shows 4 buckets 1010*a-d* containing a set of rules, the buckets 1010*a-d* are pointed to by (1012, 1014, 1016, 1018) by leaf nodes 1002, 1004, 1006, and 1008, respectively. Buckets 1010*a*, 1010*c*, and 1010*d* all contain the same rules. Because the buckets 1010*a*, 1010*c*, and 1010*d* are identified to contain the same rules, and the duplicate buckets 1010*c* and 1010*d* may be removed from memory, keeping only unique buckets 1010*a* and 1010*b*.

Figure 10D:
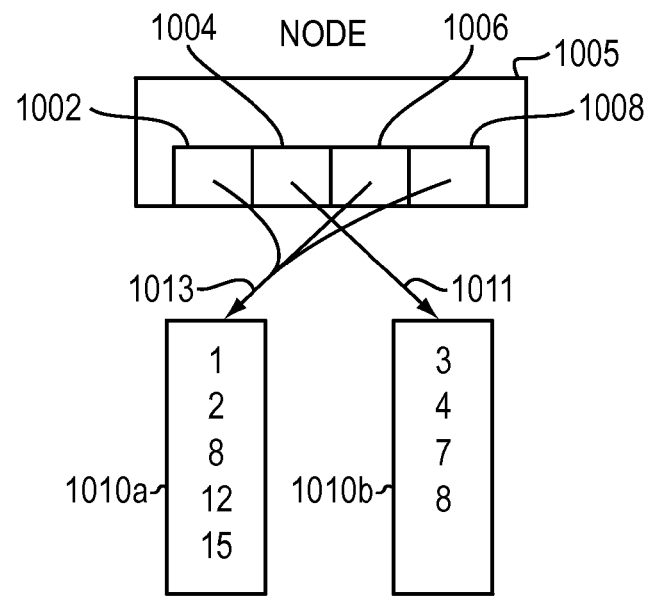

FIG. 10D shows node 1005 results in having two buckets (1010*a* and 1010*b*) containing rules that need to be stored in memory. Thus, the leaf nodes 1002, 1004, 1006, and 1008 of node 1005 only need to point to a memory location containing the set of rules in buckets 1010*a* and 1010*b*. For example, leaf nodes 1002, 1006, and 1008 all point (1013) to bucket 1010*a*, and leaf node 1004 points (1011) to bucket 1010*b*.

Figure 10E:
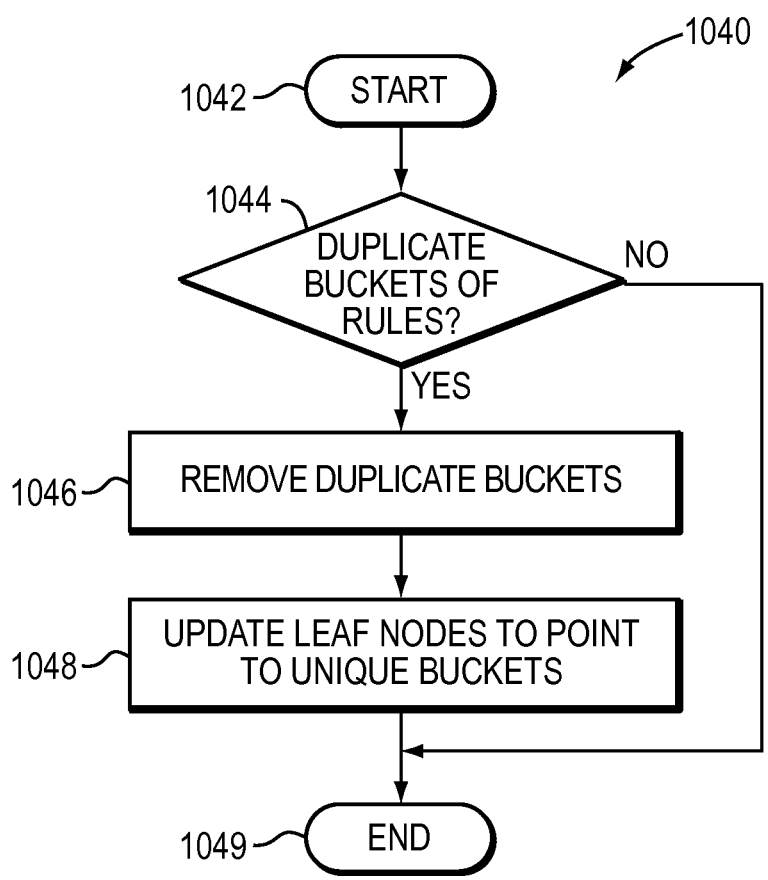
FIG. 10E illustrates a method for removing duplicate buckets of rules in a node of a decision tree.

FIG. 10E is a flow diagram of a method for removing duplicate buckets of rules in a node of a decision tree (1040). Method 1040 starts 1042 and identifies duplicate buckets of rules (1044). If duplicate buckets of rules are not identified, the method ends (1049). If duplicate buckets of rules are identified, duplicate buckets are removed (1046) and leaf nodes are updated to point to unique buckets (1048) and the method ends (1049).

Bucket duplication is not limited to child nodes having a same parent (e.g., siblings).

Figure 10F:
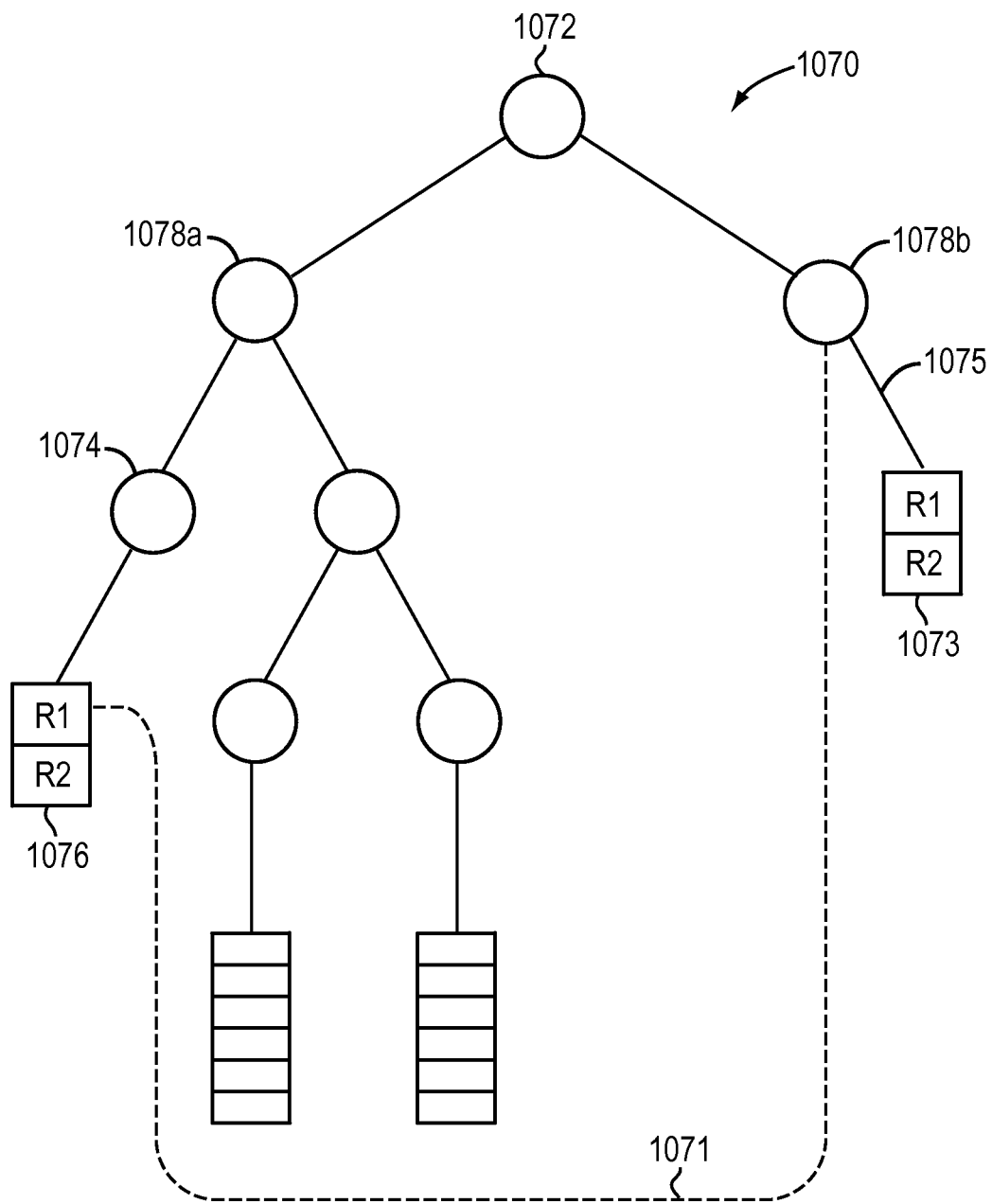
FIG. 10F illustrates a graphical example of removing duplicate buckets of rules from non-sibling nodes of a decision tree.

FIG. 10F is a graphical illustration of bucket duplication according to one embodiment. A portion of a tree (1070) is shown that includes a parent node 1072 that has child nodes 1078*a* and 1078*b* (leaf) and a grandchild node 1074. The child node 1078*b* (leaf) and grandchild 1074 (leaf) both point to buckets 1076 and 1073 respectively. The buckets 1076 and 1073 are duplicate buckets each including a duplicate rule set (e.g., R1 and R2). The bucket 1073 may be removed by pointing the child node 1078*b* to point 1071 to the bucket 1076 pointed to by the grandchild node 1074.

Figure 10G:
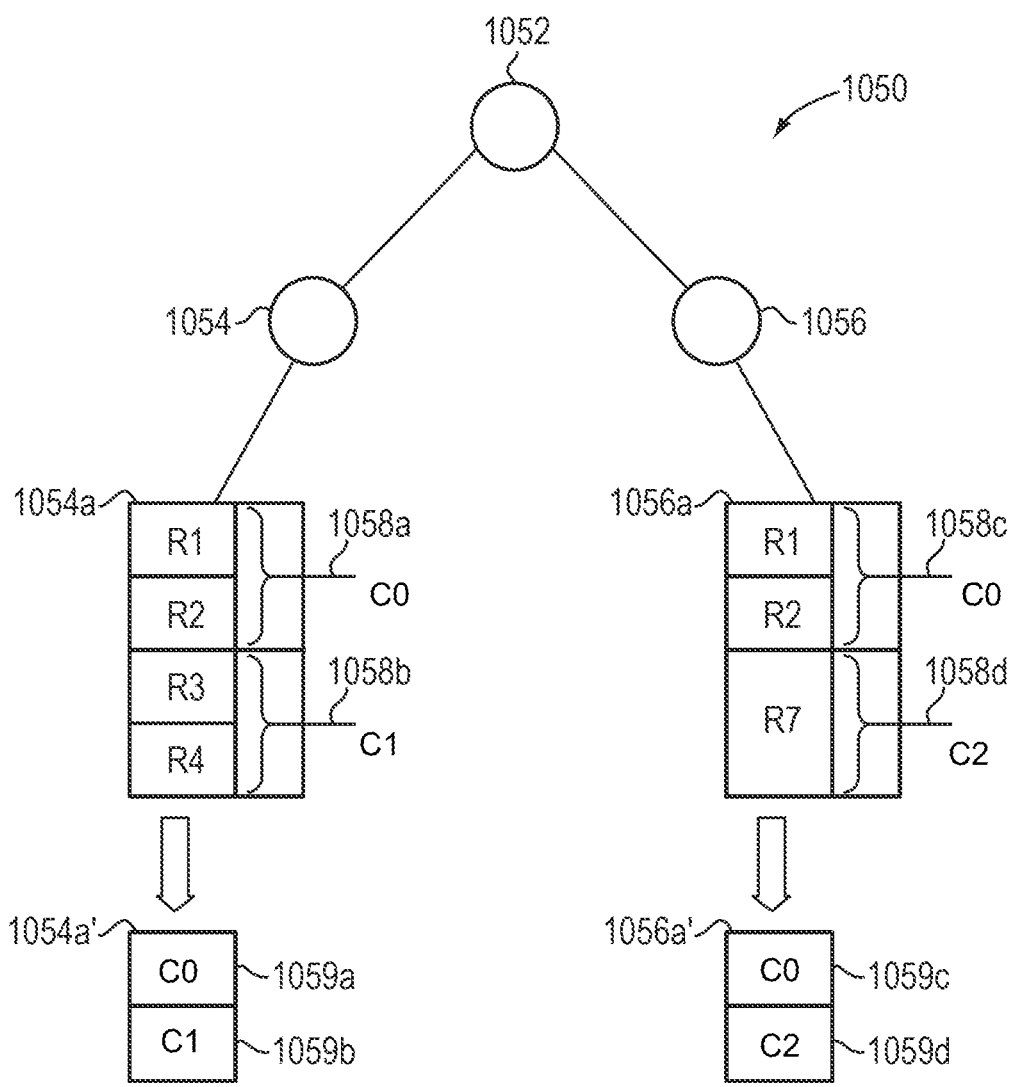
FIG. 10G illustrates a graphical example of removing partial duplicate buckets of rules in a node of a decision tree.

FIG. 10G is a graphical illustration of partial duplicate buckets of rules in a node of a decision tree. A portion of a tree (1050) is shown including a parent node 1052 and two children (leaves) 1054 and 1056 that point to buckets 1054*a* and 1056*a*, respectively. Buckets 1054*a* and 1056*a* have a partial duplicate set of rules R1 and R2. The set of rules in each bucket may be split into subsets. For example, rules in the bucket 1054*a* may be split into a first set 1058*a* including R1 and R2 and a second set 1058*b* including R3 and R4. Rules in the bucket 1056*a* may be split into a first set 1058*c* including R1 and R2 and a second set 1058*d* including R7. The bucket entries may be replaced with a linked list of chunk pointers, or pointers to sets of rules. Bucket 1054*a'* illustrates bucket 1054*a* having bucket entries replaced with a linked list of chunk pointers C0 and C1. Similarly, bucket 1056*a''* illustrates bucket 1056*a* having bucket entries replaced with a linked list of chunk pointers C0 and C2. Chunk pointer C0 points to a set of rules including R1 and R2, chunk pointer C1 points to a set of rules including R3 and R4, and chunk pointer C2 points to a set of pointers including R7.

Figure 11A:
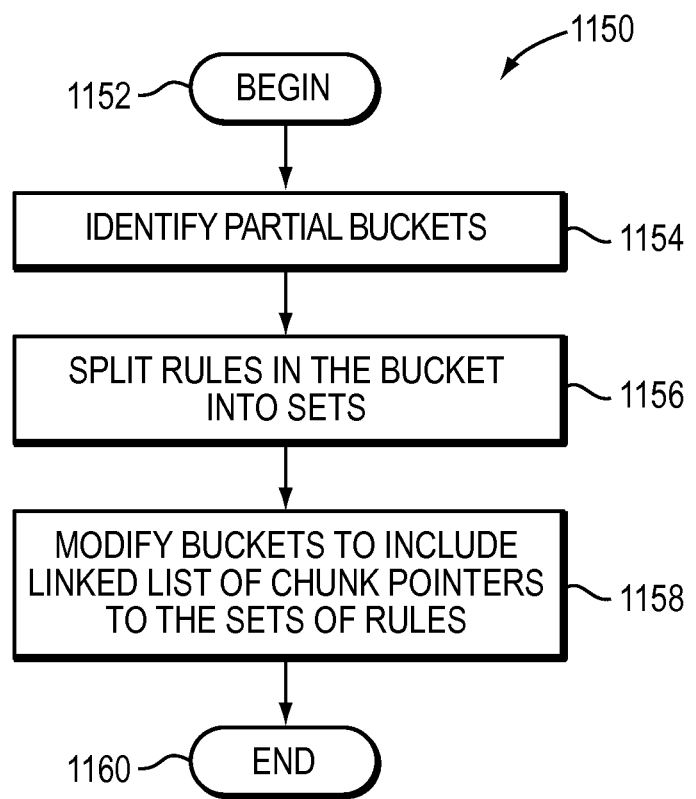
FIG. 11A is a flow diagram of a method for partial duplicate buckets of rules in a node of a decision tree.

FIG. 11A is a flow diagram of a method (1150) for partial duplicate buckets of rules in a node of a decision tree. The method begins (1152) and identifies a set of partial duplicate buckets (1154). Partial duplicate buckets each include a duplicate partial set of rules. The rules in each bucket are separated into a first and second set of rules. The first set of rules includes the duplicate partial set of rules and the second set of rules includes any remaining rules for the bucket (1156). Links (chunk pointers) are created to the first and second set of rules and the bucket is linked to the created links (1158) and the method ends (1160). Each partial duplicate bucket may be modified to store a linked list of the chunk pointers. The number of sets shown is an illustration, there could be multiple sets if there are multiple partial duplicates.

As stated above, rules may have multiple fields. Each field of the rule represents a field in a header of an incoming packet. Headers of packets generally include at least two fields, one field containing a source IP address field and a second field containing a destination IP address field. The rules may contain IP wildcards in either or both of the fields representing the source IP address field and destination IP address field of an incoming packet.

Embodiments described herein may separate rules into categories. The categories may be based on a function of the fields. The rules may be separated into categories in any suitable manner. The rules may be based on a function of the fields. For example, the rules may be categorized based on whether or not they have wildcards in the source and destination IP address fields. The categories may be as follows: 1) rules that do not have wildcards in either the source or destination fields, 2) rules that have wildcards in both the source and destination fields, 3) rules that have wildcards in the source field but not in the destination field, and 4) rules that have wildcards in the destination field but not in the source field. The fields may be any fields and any number of fields. For example, three fields may be used for categories, resulting in 8 categories. Also, instead of complete wild card, the category may be based on a field being "large" or "small." Large and small may be defined by a ratio of a range of a field value to its total space.

Figure 11B:
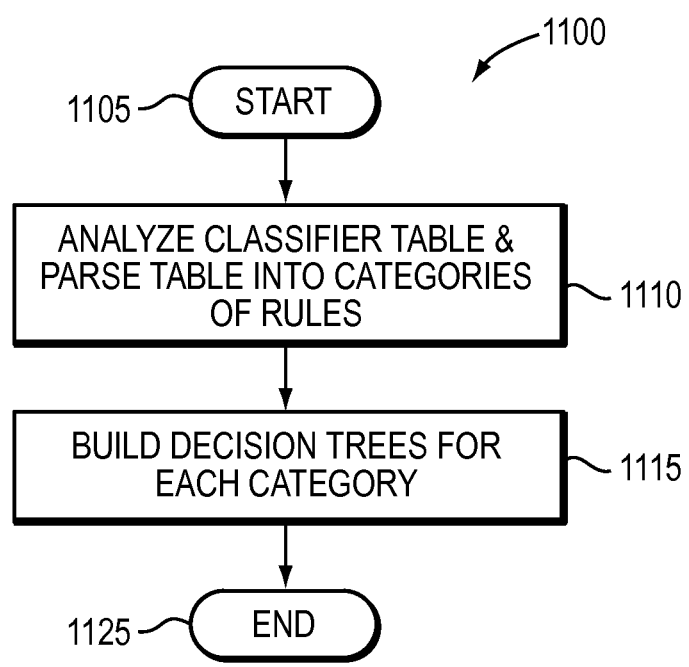
FIG. 11B illustrates a method for parsing a compiler table into categories of rules and building decision trees for each category.

FIG. 11B illustrates a method 1100 for parsing a classifier table into categories of rules and building decision trees for each category. Method 1100 begins at 1105 and then the method 1100 analyzes a classifier table and parses the table into categories of rules (1110). For each category of rules, the method 1100 builds a decision tree (1115), and the method ends (1125).

Figure 11C:
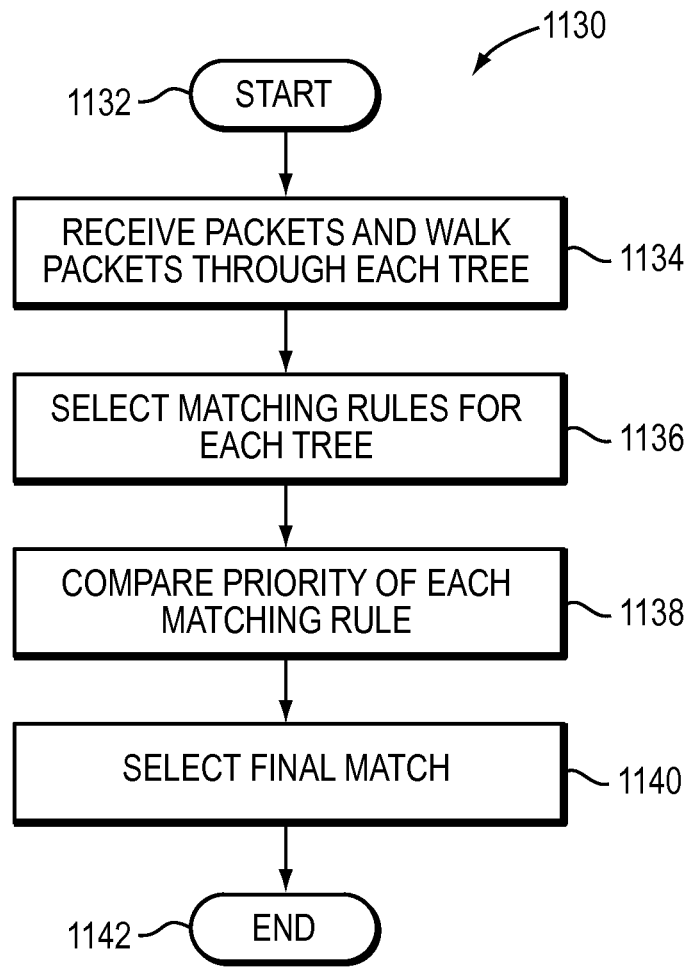
FIG. 11C illustrates a method for selecting a matching rule.

FIG. 11C illustrates a method 1130 for selecting a matching rule. Method 1130 begins at 1132. Received packets are walked by a runtime walker through each decision tree (1134). Each decision tree returns a matching rule if a matching rule is selected (1136). The priority of each matching rule is compared (1138) and a matching rule with the highest priority is selected (1140) and the method ends (1142).

Internet routers classify packets to implement a number of advanced internet services such as routing, rate limiting, access control in firewalls, virtual bandwidth allocation, policy-based routing, service differentiation, load balancing, traffic shaping, and traffic billing. These services require the router to classify incoming packets into different flows and then to perform appropriate actions depending on this classification.

Figure 12:
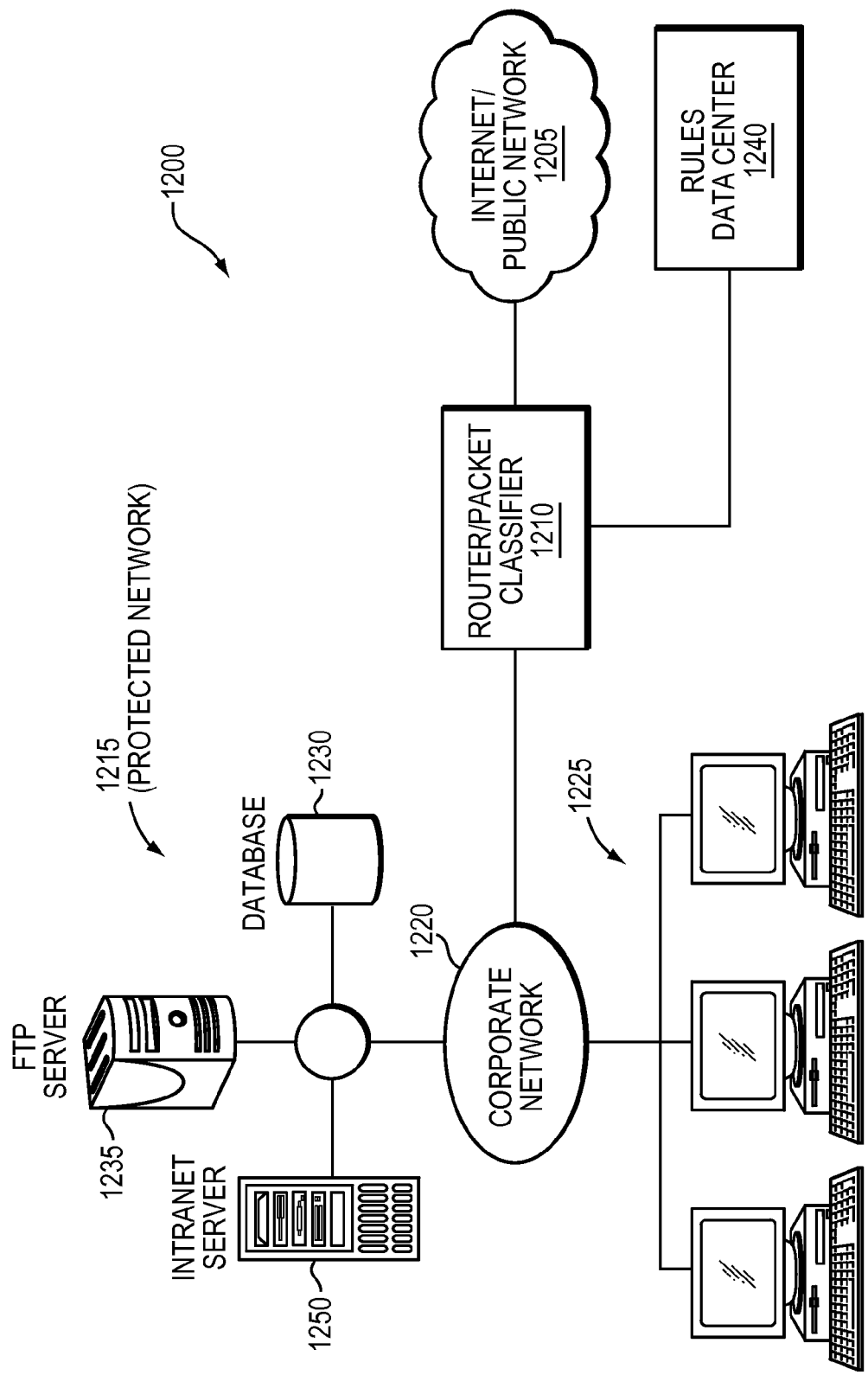
FIG. 12 is a block diagram illustrating a system in which a packet classifier operates to classify packets to provide internet services to a private network.

FIG. 12 is a block diagram illustrating a system 1200 that includes a router/packet classifier 1210, protected network 1215, and a public network 1205. The public network 1205 may comprise an unsecured wide-area network (WAN), such as the Internet, a wireless network, a local-area network, or another type of network. Protected network 1215 may comprise a secured computer network such as a local-area network (LAN) in an office or a data center. As illustrated, the LAN may be a corporate network 1220 including a plurality of work stations 1225. The plurality of work stations 1225 are operatively coupled to database 1230, FTP (file transfer protocol) server 1235, and intranet server 1250.

In system 1200, the router 1210 is connected to the public network 1205 and protected network 1215 such that network traffic flowing from public network 1205 to protected network 1215 flows first to the router 1210. The router 1210 may be a stand-alone network appliance, a component of another network appliance (e.g., firewall appliance), a software module that executes on a network appliance, or another configuration. The router 1210 may be connected to a rules datacenter 1240. In general, router 1210 inspects network traffic from public network 1205 and determines what actions to perform on the network traffic. For example, router 1210 classifies packets to implement a number of advanced internet services such as routing, rate limiting, access control in firewalls, virtual bandwidth allocation, policy-based routing, service differentiation, load balancing, traffic shaping, and traffic billing. These services require the router 1210 to classify incoming packets into different flows and then to perform appropriate actions depending on this classification.

Figure 13:
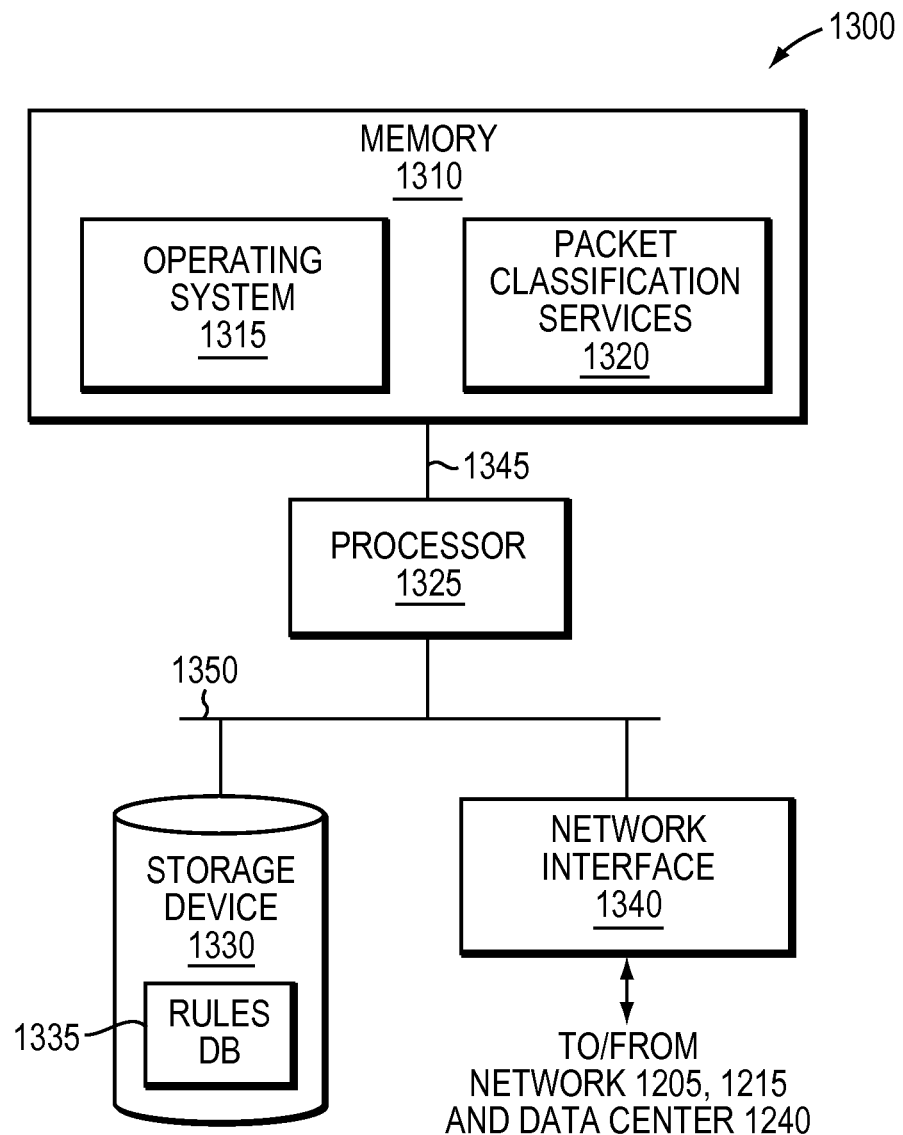
FIG. 13 is a block diagram of a router that may classify packets according to techniques disclosed herein.

FIG. 13 is a high-level block diagram of an exemplary router 1300 that may be used with embodiments described herein. Router 1300 comprises a memory 1310 coupled to a processor 1325 via a memory bus 1345 and, a storage device 1330 and a network interface 1340 coupled to the processor 1325 via an input/output (I/O) bus 1350. It should be noted that the router 1300 may include other devices, such as keyboards, display units and the like. The network interface 1340 interfaces the router 1300 with the secured network 1215, public network 1205, and rules datacenter 1240 and enables data (e.g., packets) to be transferred between the router and other nodes in the system 1200. To that end, network interface 1340 comprises conventional circuitry that incorporates signal, electrical and mechanical characteristics, and interchange circuits, needed to interface with the physical media of system 1200 and protocols running over that media.

The memory 1310 is a non-transitory computer-readable medium implemented as a RAM comprising RAM devices, such as DRAM devices and/or flash memory devices. Memory 1310 contains various software and data structures used by the processor 1325 including software and data structures that implement aspects of the embodiments described herein. Specifically, memory 1310 includes an operating system 1315 and packet classification services 1320. The operating system 1315 functionally organizes the router 1300 by invoking operations in support of software processes and services executing on router 1300, such as packet classification services 1320. Packet classification services 1320, as will be described below, comprises computer-executable instructions to compile a decision tree data structure from a given set of rules and walk incoming data packets through the compiled decision tree data structure.

Storage device 1330 is a conventional storage device (e.g., disk) that comprises rules database (DB) 1335 which is a data structure that is configured to hold various information used to compile a decision tree data structure from a given set of rules. Information may include rules having a plurality of fields corresponding to headers of incoming data packets.

It should be understood that the block, flow, network diagrams may include more or fewer elements, be arranged differently, or be represented differently. It should be understood that implementation may dictate the block, flow, network diagrams and the number of block, flow, network diagrams illustrating the execution of embodiments described herein.

It should be understood that elements of the block, flow, network diagrams described above may be implemented in software, hardware, or firmware. In addition, the elements of the block, flow, network diagrams described above may be combined or divided in any manner in software, hardware, or firmware. If implemented in software, the software may be written in any language that can support the embodiments disclosed herein. The software may be stored on any form of computer readable medium, such as random access memory (RAM), read only memory (ROM), compact disk read only memory (CD-ROM), and other non-transitory forms of computer readable medium. In operation, a general purpose or application specific processor loads and executes the software in a manner well understood in the art.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
in a processor, using a classifier table having a plurality of rules, the plurality of rules having at least one field, building a decision tree structure including a plurality of nodes, each node representing a subset of the plurality of rules;
grouping rules, by the processor, based on whether or not rules overlap;
assigning, by the processor, priority values to the plurality of rules including assigning unique priority values within each group of overlapping rules and enabling non-overlapping rules to have a same priority value; and storing, by the processor, the decision tree structure, including storing the plurality of rules and the priority value assigned, in a memory.

2. An apparatus comprising:

a memory;

a processor coupled to the memory, the processor configured to:

use a classifier table having a plurality of rules, the plurality of rules having at least one field;

build a decision tree structure including a plurality of nodes, each node representing a subset of the plurality of rules;

group rules based on whether or not rules overlap;

assign priority values to the plurality of rules including assigning unique priority values within each group of overlapping rules and enabling non-overlapping rules to have a same priority value; and store the decision tree structure in the memory including storing the plurality of rules and the priority value assigned.

3. A non-transitory computer-readable medium having encoded thereon a sequence of instructions which, when executed by a processor, causes the processor to:

use a classifier table having a plurality of rules, the plurality of rules having at least one field;

build a decision tree structure including a plurality of nodes, each node representing a subset of the plurality of rules;

group rules based on whether or not rules overlap;

assign priority values to the plurality of rules including assigning unique priority values within each group of overlapping rules and enabling non-overlapping rules to have a same priority value; and store the decision tree structure including storing the plurality of rules and the priority value assigned.

4. A method comprising:

in a processor, using a classifier table having a plurality of rules, the plurality of rules having at least one field, building a decision tree structure including a plurality of nodes, each node representing a subset of the plurality of rules;

identifying, by the processor, duplication in the decision tree structure;

modifying, by the processor, the decision tree structure based on the identified duplication; and storing, by the processor, the modified decision tree structure in a memory.

5. The method of claim 4 further wherein the plurality of nodes includes parent nodes and child nodes, wherein identifying includes:

for each level of the decision tree, comparing a subset of rules represented by child nodes having a same parent node; and identifying a set of duplicate child nodes, the set of duplicate child nodes having a duplicate subset of the plurality of rules; and wherein modifying includes:

selecting one child node of the set of duplicate child nodes identified as a unique child node; and linking the other child nodes of the set of duplicate child nodes identified to a same subtree as the unique child node.

6. The method of claim 4 wherein the plurality of nodes includes parent nodes and child nodes, the method further comprising:

converting each child node having a number of rules less than or equal to a given number of rules to a leaf node;

creating a corresponding bucket for each child node converted, the corresponding bucket including rules of the child node converted;

linking each leaf node to the corresponding bucket created;

identifying a set of duplicate buckets, duplicate buckets each including a same set of rules;

selecting one bucket of the set of duplicate buckets and removing other buckets of the set of duplicate buckets; and changing links to removed buckets to links to the one bucket selected.

7. The method of claim 4 wherein the plurality of nodes includes parent nodes and child nodes, the method further comprising:

converting each child node having a number of rules less than or equal to a given number of rules to a leaf node;

creating a corresponding bucket for each child node converted, the corresponding bucket including rules of the child node converted;

linking each leaf node to the corresponding bucket created;

identifying a set of partial duplicate buckets, partial duplicate buckets each including a duplicate partial set of rules;

separating rules in each bucket in the set of partial duplicate buckets into a first and second set of rules for each bucket, the first set of rules for each bucket including the duplicate partial set of rules and the second set of rules for each bucket including any remaining rules for each bucket; and creating a link in each partial duplicate bucket to the first set of rules and creating a link in each partial duplicate bucket to the second set of rules.

8. The method of claim 7 wherein each partial duplicate bucket includes a linked list of pointers to the first and second set of rules.

9. The method of claim 4 wherein the plurality of nodes includes parent nodes and child nodes, the method further comprising:

converting each child node having a number of rules less than or equal to a given number of rules to a leaf node;

creating a corresponding bucket for each child node converted, the corresponding bucket including bucket entries linked to rules of the child node converted;

linking each leaf node to the corresponding bucket created;

identifying a duplicate one or more rules included in at least two buckets; and replacing at least one bucket entry of the at least two buckets identified with at least one same bucket entry, the same bucket entry being linked to the one or more duplicate rules.

10. An apparatus comprising:

a memory;

a processor coupled to the memory, the processor configured to:

use a classifier table having a plurality of rules, the plurality of rules having at least one field, building a decision tree structure including a plurality of nodes, each node representing a subset of the plurality of rules;

identify duplication in the decision tree structure;

modify the decision tree structure based on the identified duplication; and store the modified decision tree structure in the memory.

11. The apparatus of claim 10 further wherein the plurality of nodes includes parent nodes and child nodes, wherein to identify duplication the processor is further configured to:

for each level of the decision tree, compare a subset of rules represented by child nodes having a same parent node for each level of the decision tree; and identify a set of duplicate child nodes, the set of duplicate child nodes having a duplicate subset of the plurality of rules; and wherein to modify the processor is further configured to include:

select one child node of the set of duplicate child nodes identified as a unique child node; and link the other child nodes of the set of duplicate child nodes identified to a same subtree as the unique child node.

12. The apparatus of claim 10 wherein the plurality of nodes includes parent nodes and child nodes, wherein the processor is further configured to:

convert each child node having a number of rules less than or equal to a given number of rules to a leaf node;

create a corresponding bucket for each child node converted, the corresponding bucket including rules of the child node converted;

link each leaf node to the corresponding bucket created;

identify a set of duplicate buckets, duplicate buckets each including a same set of rules;

select one bucket of the set of duplicate buckets and removing other buckets of the set of duplicate buckets; and change links to removed buckets to links to the one bucket selected.

13. The apparatus of claim 10 wherein the plurality of nodes includes parent nodes and child nodes, wherein the processor is further configured to:

convert each child node having a number of rules less than or equal to a given number of rules to a leaf node;

create a corresponding bucket for each child node converted, the corresponding bucket including rules of the child node converted;

link each leaf node to the corresponding bucket created;

identify a set of partial duplicate buckets, partial duplicate buckets each including a duplicate partial set of rules;

separate rules in each bucket in the set of partial duplicate buckets into a first and second set of rules for each bucket, the first set of rules for each bucket including the duplicate partial set of rules and the second set of rules for each bucket including any remaining rules for each bucket; and create a link in each partial duplicate bucket to the first set of rules and creating a link in each partial duplicate bucket to the second set of rules.

14. The apparatus of claim 13 wherein each partial duplicate bucket includes a linked list of pointers to the first and second set of rules.

15. The apparatus of claim 10 wherein the plurality of nodes includes parent nodes and child nodes, wherein the processor is further configured to:

convert each child node having a number of rules less than or equal to a given number of rules to a leaf node;

create a corresponding bucket for each child node converted, the corresponding bucket including bucket entries linked to rules of the child node converted;

link each leaf node to the corresponding bucket created;

identify a duplicate one or more rules included in at least two buckets;

replace at least one bucket entry of the at least two buckets indentificd identified with at least one same bucket entry, the same bucket entry being linked to the one or more duplicate rules.

16. A non-transitory computer-readable medium having encoded thereon a sequence of instructions which, when executed by a processor, causes the processor to:

use a classifier table having a plurality of rules, the plurality of rules having at least one field, building a decision tree structure including a plurality of nodes, each node representing a subset of the plurality of rules;

identify duplication in the decision tree structure;

modify the decision tree structure based on the identified duplication; and store the modified decision tree structure in a memory.

17. The non-transitory computer-readable medium of claim 16 wherein the plurality of nodes includes parent nodes and child nodes, wherein the sequence of instructions which, when executed by a processor, further causes the processor to:

for each level of the decision tree, compare a subset of rules represented by child nodes having a same parent node for each level of the decision tree; and identify a set of duplicate child nodes, the set of duplicate child nodes having a duplicate subset of the plurality of rules; and wherein to modify includes the processor further caused to:

select one child node of the set of duplicate child nodes identified as a unique child node; and link the other child nodes of the set of duplicate child nodes identified to a same subtree as the unique child node.

18. The non-transitory computer-readable medium of claim 16 wherein the plurality of nodes includes parent nodes and child nodes, wherein the sequence of instructions which, when executed by a processor, further causes the processor to:

convert each child node having a number of rules less than or equal to a given number of rules to a leaf node;

create a corresponding bucket for each child node converted, the corresponding bucket including rules of the child node converted;

link each leaf node to the corresponding bucket created;

identify a set of duplicate buckets, duplicate buckets each including a same set of rules;

select one bucket of the set of duplicate buckets and removing other buckets of the set of duplicate buckets; and change links to removed buckets to links to the one bucket selected.

19. The non-transitory computer-readable medium of claim 16 wherein the plurality of nodes includes parent nodes and child nodes, wherein the sequence of instructions which, when executed by a processor, further causes the processor to:

convert each child node having a number of rules less than or equal to a given number of rules to a leaf node;

create a corresponding bucket for each child node converted, the corresponding bucket including rules of the child node converted;

link each leaf node to the corresponding bucket created;

identify a set of partial duplicate buckets, partial duplicate buckets each including a duplicate partial set of rules;

separate rules in each bucket in the set of partial duplicate buckets into a first and second set of rules for each bucket, the first set of rules for each bucket including the duplicate partial set of rules and the second set of rules for each bucket including any remaining rules for each bucket; and create a link in each partial duplicate bucket to the first set of rules and creating a link in each partial duplicate bucket to the second set of rules.

20. The non-transitory computer-readable medium of claim 19 wherein each partial duplicate bucket includes a linked list of pointers to the first and second set of rules.

21. The non-transitory computer-readable medium of claim 16 wherein the plurality of nodes includes parent nodes and child nodes, wherein the sequence of instructions which, when executed by a processor, further causes the processor to:

convert each child node having a number of rules less than or equal to a given number of rules to a leaf node;

create a corresponding bucket for each child node converted, the corresponding bucket including bucket entries linked to rules of the child node converted;

link each leaf node to the corresponding bucket created;

identify a duplicate one or more rules included in at least two buckets; and replace at least one bucket entry of the at least two buckets identified with at least one same bucket entry, the same bucket entry being linked to the one or more duplicate rules.

* * * * *

UNITED STATES PATENT AND TRADEMARK OFFICE
CERTIFICATE OF CORRECTION

PATENT NO. : 8,934,488 B2  
APPLICATION NO. : 13/664015  
DATED : January 13, 2015  
INVENTOR(S) : Rajan Goyal et al.

Page 1 of 1

It is certified that error appears in the above-identified patent and that said Letters Patent is hereby corrected as shown below:

In the Claims

In Column 19, Claim 15, line 62, delete "indentified"

Signed and Sealed this
Thirtieth Day of June, 2015

Michelle K. Lee
*Director of the United States Patent and Trademark Office*